United States Patent
Selnes

(10) Patent No.: US 11,646,645 B2
(45) Date of Patent: May 9, 2023

(54) ELECTROMAGNETIC MAT FOR A STATOR OR ROTOR COMPONENT OF AN ELECTRIC MACHINE

(71) Applicant: Alva Industries AS, Trondheim (NO)

(72) Inventor: Jörgen Selnes, Trondheim (NO)

(73) Assignee: Alva Industries AS, Trondheim (NO)

( * ) Notice: Subject to any disclaimer, the term of this patent is extended or adjusted under 35 U.S.C. 154(b) by 346 days.

(21) Appl. No.: 16/755,278

(22) PCT Filed: Oct. 10, 2018

(86) PCT No.: PCT/NO2018/050242
§ 371 (c)(1),
(2) Date: Apr. 10, 2020

(87) PCT Pub. No.: WO2019/074375
PCT Pub. Date: Apr. 18, 2019

(65) Prior Publication Data
US 2020/0244149 A1 Jul. 30, 2020

(30) Foreign Application Priority Data
Oct. 11, 2017 (NO) .................................. 20171616

(51) Int. Cl.
*H02K 3/04* (2006.01)
*H02K 15/04* (2006.01)
(Continued)

(52) U.S. Cl.
CPC .............. *H02K 15/04* (2013.01); *H02K 3/04* (2013.01); *H02K 15/02* (2013.01); *H02K 15/06* (2013.01); *H02K 1/06* (2013.01)

(58) Field of Classification Search
CPC . H01R 39/20; H02K 1/02; H02K 5/02; H02K 1/04; H02K 3/04; H02K 3/26;
(Continued)

(56) References Cited

U.S. PATENT DOCUMENTS 4,504,098 A * 3/1985 Battarel .............. F16C 32/0465
310/90.5
2005/0206270 A1 9/2005 Aisenbrey

FOREIGN PATENT DOCUMENTS

JP H09271158 A * 10/1997
JP H09271158 A 10/1997
(Continued)

OTHER PUBLICATIONS

JP-H09271158 machine translation on Jun. 30, 2022.*
International Search Report and Written Opinion dated Dec. 18, 2018 (PCT/NO2018/050242).

*Primary Examiner* — Ahmed Elnakib
*Assistant Examiner* — Leda T Pham
(74) *Attorney, Agent, or Firm* — Alix, Yale & Ristas, LLP

(57) ABSTRACT

A method of producing an electromagnetic mat for forming a stator or rotor component of an electric machine. The electromagnetic mat has structural fibre lengths and a plurality of winding fibre lengths for forming a winding fibre that is in a winding pattern for forming one or more windings of the electric machine. The electromagnetic mat is formed by forming a support structure with the structural fibre lengths and inserting the winding fibre lengths into the support structure so that the winding fibre lengths extend across the structural fibre lengths and the structural fibre lengths lock the winding fibre lengths in position.

20 Claims, 13 Drawing Sheets

(51) Int. Cl.
*H02K 15/02* (2006.01)
*H02K 15/06* (2006.01)
*H02K 1/06* (2006.01)

(58) Field of Classification Search
CPC .... H02K 15/02; H02K 15/04; H02K 15/0407; H02K 15/06; H02K 7/09; F16C 32/0465; F16C 32/0459
See application file for complete search history.

(56) References Cited

FOREIGN PATENT DOCUMENTS

| | | | |
|---|---|---|---|
| WO | 2012032399 A2 | 3/2012 | |
| WO | WO-2012032399 A2 * | 3/2012 | ............... H02K 3/02 |

\* cited by examiner

FIG. 15
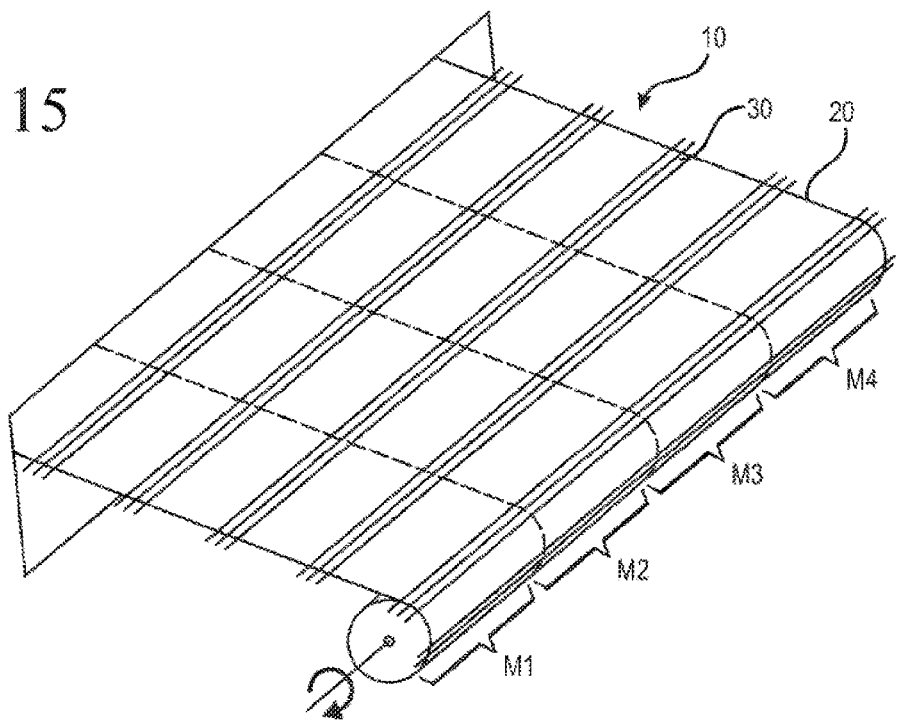
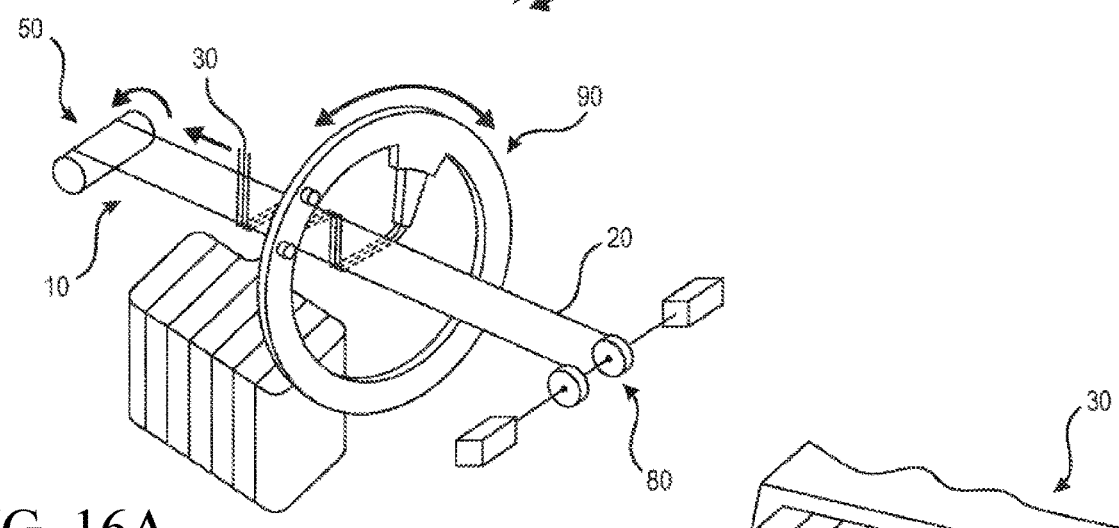
FIG. 16A
FIG. 16B
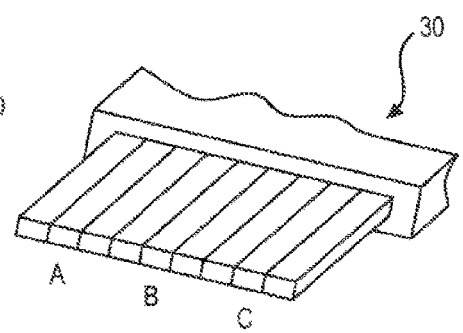
FIG. 16C
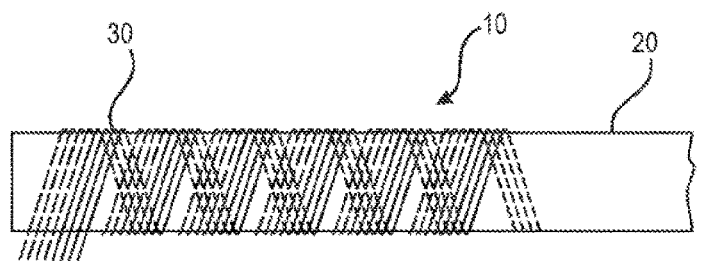

ELECTROMAGNETIC MAT FOR A STATOR OR ROTOR COMPONENT OF AN ELECTRIC MACHINE

BACKGROUND

The disclosed embodiments concern the production of an electromagnetic mat for a stator or rotor component of an electric machine, the production of a stator or rotor component comprising the electromagnetic mat for an electric machine and/or the production of an electric machine comprising a stator or rotor component comprising the electromagnetic mat. The disclosure also concerns an electromagnetic mat for a stator or rotor component of an electric machine, a stator or rotor component comprising the electromagnetic mat for an electric machine, and/or an electric machine comprising a stator or rotor component comprising the electromagnetic mat.

As electric machines are becoming more abundant in different applications there has lately been an increasing focus on developing high performance electric motors, generator or other electric machines in more cost-efficient manner.

WO2012032399 A2 discloses a composite drive unit including a composite material comprising conductive fibres as an integrated part of the composite material. The conductive fibres can be organized in different patterns, and each of the conductive fibres is terminated to an electrical conductor. A material for a composite drive unit includes a plurality of conductive fibres arranged in a predetermined pattern. The plurality of conductive fibres are embedded in a matrix material, and the conductive fibres are connectable to a source of electricity to generate a magnetic field for operating the composite drive unit.

However, this document does not disclose a scalable and/or flexible production method for electrical machines and the components thereof.

Today, automatic winding equipment for forming windings of an electric machine is very expensive and can only create a small number of different designs. There is accordingly a need for a method of production of stator or rotor components that can cut production steps and costs whilst providing a flexible highly customisable method.

SUMMARY

In a first aspect, disclosed herein is a method of providing and/or producing an electromagnetic mat for forming a stator or rotor component of an electric machine, wherein the electromagnetic mat comprises at least one winding fibre (and/or a plurality of winding fibre lengths for forming the at least one winding fibre) that is for forming one or more windings of the electric machine.

In a second aspect, disclosed herein is a method of production of a stator or rotor component of an electric machine, wherein the method comprises forming the stator or rotor component using an electromagnetic mat (which may have been formed from the method of the first aspect) that comprises at least one winding fibre that is for forming one or more windings of the electric machine.

In a third aspect, disclosed herein is a method of production of an electric machine, wherein the method comprises forming (i.e. making, building, producing, assembly, manufacturing etc.) the electric machine using a stator or rotor component (which may have been formed from the method of the second aspect) that comprises an electromagnetic mat that comprises at least one winding fibre that forms one or more windings of the electric machine.

In a fourth aspect, disclosed herein is an electromagnetic mat for forming a stator or rotor component of an electric machine, wherein the electromagnetic mat comprises at least one winding fibre (and/or a plurality of winding fibre lengths for forming the at least one winding fibre) that is for forming one or more windings of the electric machine.

In a fifth aspect, disclosed herein is a stator or rotor component for an electric machine, wherein the stator or rotor component comprises an electromagnetic mat (which may be the electromagnetic mat of the fourth aspect) that comprises at least one winding fibre that is for forming one or more windings of the electric machine.

In a sixth aspect, disclosed herein is an electric machine, wherein the electric machine comprises a stator or rotor component (that may be the stator or rotor component of the fifth aspect) that comprises an electromagnetic mat that comprises at least one winding fibre that forms one or more windings of the electric machine.

In a seventh aspect, disclosed herein is a method of producing an electromagnetic mat for forming a stator or rotor component of an electric machine, wherein the electromagnetic mat comprises: structural fibre lengths; and a plurality of winding fibre lengths for forming (i.e. connected or connectable to form) a winding fibre that is in a winding pattern for forming one or more windings of the electric machine, wherein the method comprises: forming the electromagnetic mat by forming a support structure with the structural fibre lengths and inserting the winding fibre lengths into the support structure so that the winding fibre lengths extend across the structural fibre lengths and the structural fibre lengths lock the winding fibre lengths in position.

In an eighth aspect, disclosed herein is an electromagnetic mat for forming a stator or rotor component of an electric machine, wherein the mat comprises: structural fibre lengths that form a support structure; and a plurality of winding fibre lengths for forming (i.e. connected or connectable to form) a winding fibre that is in a winding pattern for forming one or more windings of the electric machine, wherein the winding fibre lengths have been inserted into the support structure so that the winding fibre lengths extend across the structural fibre lengths and the structural fibre lengths lock the winding fibre lengths in position.

In a ninth aspect, disclosed herein is a method of production of a stator or rotor component of an electric machine, wherein the method comprises: providing an electromagnetic mat that comprises a winding fibre that is in a winding pattern for forming one or more windings of the electric machine; and shaping the electromagnetic mat to form the stator or rotor component of the electric machine.

In a tenth aspect, disclosed herein is a stator or rotor component for an electric machine, wherein the stator or rotor component comprises an electromagnetic mat that comprises a winding fibre that is in a winding pattern for forming one or more windings of the electric machine; and wherein the electromagnetic mat has been shaped to form the stator or rotor component of the electric machine.

These methods and/or products of the first to tenth aspects may each have one or more or all of the below described features, including the optional features.

The electromagnetic mat may comprise a plurality of winding fibre lengths that are aligned in a pattern for forming the at least one winding. By the winding fibre lengths being for forming a winding fibre may mean that either they are connected (e.g. because the winding fibre lengths are parts of a continuous winding fiber or they are discrete fibre lengths that have been connected to form the winding fibre) or they are in a position where they may be connected to form at least one winding fibre.

The winding fibre lengths for forming the winding fibre may be connected (either due to the electromagnetic mat being formed from a continuous winding fibre or being formed from discrete fibre lengths that are connected after forming of the mat to form a winding fibre) to provide an electrically conductive continuous winding fibre. The electrically continuous winding fibre (once formed) comprising a plurality of winding fibre lengths is in a winding pattern to form a winding for an electric machine.

The winding fibre lengths may be parts of the winding fibre within the active area of the electromagnetic mat (e.g. between the two outermost structural fibre lengths). These may be the parts of the winding fibres that all extend in broadly the same direction to give an electromagnetic effect in the electric machine. The winding fibre lengths may be the parts of the winding fibre between end windings. The end windings may be the connection portions of the winding fibre that connect two winding fibre lengths. The end windings may be the portions of the winding fibre that have a significant change direction, e.g. the parts that extend through a 180° turn. Thus the winding fibre may be made up of a plurality of winding fibre lengths and a plurality of end windings. The winding fibre lengths may be connected via the end windings to form one or more winding fibres. Each winding fibre length may be connected to another winding fibre length by an end winding.

The one or more windings of an electric machine may comprise at least two winding fibre lengths that are connected by an end winding and that have the function of creating an electromagnetic effect when in an operating electric machine.

The winding fibre lengths may extend in a direction across the width of the electromagnetic mat and/or the structural fibre lengths may extend in a direction along the length of the electromagnetic mat. The extension directions may be parallel to the width/length or broadly in the same direction.

The winding fibre lengths may be inserted into the support structure such that they extend across (i.e. intersect) the structural fibre lengths. This may be regarded as winding fibre insertion or weft insertion.

The support structure may be formed by a plurality of structural fibre lengths that are spaced apart and extend alongside each other, e.g. extend in the same direction.

The structural fibre lengths may lock the winding fibre lengths in position. This may thus mean that the structural fibre lengths lock the winding fibre and/or the winding pattern in position in the electromagnetic mat.

Two or more or all of the connected winding fibre lengths may be parallel to each other and/or two or more or all of the structural fibre lengths may be parallel to each other.

The structural fibre lengths may be spaced apart and extend in a first direction of the electromagnetic mat. Each winding fibre length may extend in a second direction of the electromagnetic mat.

The at least one winding fibre may be aligned in a winding pattern so as to create a moving (e.g. oscillating) electromagnetic field when induced with an alternating current or constant electromagnetic field when induced with direct current.

The method may provide opportunities for altering the design, such as the winding pattern design, in a simple manner.

The inventive embodiments may comprise providing and/or forming an electromagnetic mat with winding fibres that are arranged in a pattern so as to form windings when the electromagnetic mat is used to form a stator or rotor component.

The electromagnetic mat may comprise one or more electrically continuous winding fibres.

The disclosed embodiments may concern using the electromagnetic mat to form the rotor or stator component of the electric machine.

By forming a stator or rotor component from an electromagnetic mat with winding fibres, a highly customisable stator or rotor component may be formed. This is because the electromagnetic mat may be tailored in both its properties and size and geometry during manufacture by changing the winding fibres and other fibres that are used to form the mat. For example different fibres with different properties may be used and/or different patterns of fibre may be used to achieve many different properties, effects and geometries etc.

The forming may be performed using a machine (e.g. a loom). The machine may be controllable to allow adjustment of the winding pattern, and/or the dimensions of the electromagnetic mat. This adjustment may be as an electromagnetic mat is being formed and/or between the production of different electromagnetic mats (including when the electromagnetic mats are formed continuously).

Many different electromagnetic mats may be formed using the same manufacturing machine (e.g. a loom) by changing the fibres used, the winding pattern created by the manufacturing machine and the dimensions of the electromagnetic mat. The manufacturing machine may be controllable such that the output electromagnetic mat can be customised.

By changing the number of winding fibres in the electromagnetic mat the number of phases may be changed, by changing the distance between winding fibre lengths the number of poles may be changed, by changing the winding insertion method and/or how winding fibre lengths are connected and/or how continuous winding fibres are inserted the winding pattern may be changed, and/or by changing the length of the winding fibre lengths and/or by changing the distance between the outermost structural fibers (i.e. changing the width of the electromagnetic mat) the width (e.g. the active width) of the electromagnetic mat and hence length (e.g. distance in the axial direction) of the electric machine may be changed.

The electromagnetic mat may comprise windings for 1 to 100 phases, or 1 to 4 phases, such as 3 phases.

The electromagnetic mat may be formed to any desired geometry.

The width (e.g. the dimension in the direction in which the winding fibre lengths at least broadly extend) of the electromagnetic mat may be from 100 micrometers to 10 meters between the outermost structural fibers (i.e. the width of the active area), the width may for example be from 5 mm to 1000 mm, or 5 mm to 200 mm. Applications for larger electrical machines may have an electromagnetic mat with a width of the active area from 100 mm to 4000 mm. Applications for smaller electrical machines may have an electromagnetic mat with a width of the active area from 1 mm to 5 mm.

The electromagnetic mat may be formed by weaving (including 3D weaving), twining, winding, braiding (including 3D braiding), knitting (including 3D knitting), etc. The mat may be a fabric, e.g. a woven fabric, formed from the structural fibre lengths and winding fibre lengths. The electromagnetic mat may be a mesh fibre structure with electromagnetic properties. The electromagnetic mat may also be referred to as a mesh fibre structure.

The method of forming the electromagnetic mat may be referred to as fibre printing.

The winding fibres may be or comprise fibres with electromagnetic properties. The winding fibres may be fibres that are aligned in a winding pattern such that when the rotor or stator component is formed the winding fibres may form windings.

The winding fibres are referred to as such because they are fibres that are used to form the one or more windings of the electric machine. The winding fibre may be aligned in a winding pattern that when induced with a direct or alternating current creates a constant or oscillating magnetic field respectively.

The structural fibre lengths may be warps and/or the winding fibre lengths may be wefts of the electromagnetic mat.

The structural fibre lengths may each be formed from discrete structural fibres and/or the structural fibre lengths may be formed from a continuous structural fibre that is turned back and forth on itself to form a number of connected structural fibre lengths.

The first direction and the second direction may be different directions. The first and second directions may or may not be perpendicular to each other. The second direction may be across the first direction such that the winding fibre lengths at least in part extend in a direction that intersects the direction in which at least some of the structural fibre lengths extend. For example the first direction may be the longitudinal direction (i.e. length direction) of the electromagnetic mat and the second direction may be a transverse direction (i.e. width direction) of the electromagnetic mat.

The first and second directions may not be straight directions. For example the structural fibre lengths and/or winding fibre lengths may extend in a curved direction. Also, each of the structural fibre lengths may not extend exactly in the first direction but rather the average direction of the structural fibre lengths may be in a first broad direction. Similarly the winding fibre lengths may not extend exactly in the second direction but rather the average direction of the winding fibre lengths may be in a second broad direction.

The electromagnetic mat may comprise some property modifying fibre lengths, e.g. structural fibre lengths, that extend in the same direction as the winding fibre lengths e.g. that are parallel to at least some of the winding fibre lengths.

The difference between the first and second direction may be dependent on the desired winding pattern provided by the one or more winding fibres.

The winding fibre lengths may be interweaved (which may be interpreted as encompassing interwound, intertwined, interweaved, intertwisted, interlaced etc.) with the structural fibre lengths, i.e. inserted into the support structure. This may mean that the structural fibre lengths provide structural support for the winding fibre lengths and/or the winding and that the structural fibre lengths lock the winding fibre lengths and/or the winding in place in the electromagnetic mat. This means that the winding fibre lengths may be precisely positioned during manufacture of the electromagnetic mat to achieve certain electromagnetic properties of the resulting rotor or stator and then secured in place using the structural fibre lengths. This may provide an electromagnetic mat for forming a stator or a rotor of an electric machine that is easy to work with. This is because the locking of the winding fibre lengths by the structural fibre lengths may give a degree of robustness to the mat that eases the manufacture of the stator or rotor component from the mat whilst still having a reliable manufacturing method.

The interweaving of the winding fibre lengths with the structural fibre lengths may allow high precision with regard to the location of the slots and poles etc. of the component formed using the mat.

The method may comprise locating at least two structural fibre lengths in a spaced apart location and then interweaving the winding fibre lengths with the structural fibre lengths. The structural fibre lengths may provide a grid into which the winding fibre lengths can be positioned and locked. Thus the winding fibre lengths and hence winding fibre may be located and locked into the desired winding pattern during manufacture of the electromagnetic mat.

The method may comprise weaving, twining, winding, braiding, knitting of fibre warps with fibre wefts.

The electromagnetic mat may be formed by weaving, e.g. 3D weaving.

Thus the step of inserting the winding fibre lengths into the support structure may comprise weaving the winding fibre lengths across the structural fibre lengths.

The winding pattern may be achieved by weaving the winding fibre lengths into the structural fibre lengths. The structural fibre lengths may be warps around which the winding fibre lengths as wefts are woven.

The structural fibre lengths may be held under tension to form a support structure around which the winding fibre lengths can be woven in a pattern for forming one or more windings of an electric machine.

The weaving pattern may comprise one or more of plain weave, tabby weave, linen weave, taffeta weave, basket weave, satin weave, and/or twill weave. The weaving pattern may be any known interlacing pattern. The weaving pattern chosen may depend on factors such as the desired mechanical strength and/or the winding fill factor.

The tension applied may for example be between a few micrograms to 100 kg per structural fibre. For example the tension may be from 1 g to 10 kg or 50 g to 2 kg. The applied tension may depend on factors such as the material of the structural fibre and the manufacturing machine being used.

The tension applied to the structural fibre lengths may vary between different lengths. The applied tension may be varied based on the desired locking effect on the winding fibres interwoven with the structural fibre lengths.

The tension in the structural fibre lengths may affect the effective width and/or height of the winding fibre lengths.

The winding fibre lengths may be provided by weaving a continuous winding fibre back and forth across the structural fibre lengths. Alternatively or additionally the winding fibre lengths may be provided by weaving discrete winding fibre lengths across the structural fibre lengths. The discrete winding fibre lengths may be woven into the structural fibres such that their ends protrude beyond the outermost structural fibre lengths on each side.

In the case the mat is formed, e.g. woven, using discrete winding fibre lengths, their ends may be connected to form a winding fibre in a pattern that forms at least one winding. The step of connecting the ends of the discrete winding fibre lengths may be performed after the electromagnetic mat has been formed (i.e. after it has been woven).

The weaving process may be shuttle weaving such as multi shuttle weaving. This weaving process can allow a continuous winding fibre to be woven back and forth across the structural fibre lengths.

At least two of the winding fibre lengths may be woven into the support structure by weaving the winding fibre (i.e. a continuous winding fibre) back and forth across the structural fibre lengths.

The weaving process may comprise passing one or more shuttles back and forth through sheds formed in the structural fibre lengths so as to interweave the winding fibre(s) onto the structural fibre lengths. If more than one winding fibre is being woven into the structural fibre lengths multiple shuttles may be used, wherein each shuttle guides one or more winding fibres through the structural fibre lengths as it is passed back and forth through the sheds.

The number of shuttles may depend on the number of winding fibres per phase and/or the number of phases, i.e. it may depend on the total number of winding fibres.

The winding fibre lengths (and property modifying fibre lengths if present) may be inserted/woven into the support structure/structural fibre lengths by projectile (gripper) weaving, rapier weaving, air jet weaving, and/or water jet weaving.

The electromagnetic mat may be formed, e.g. woven, with a three phase winding pattern. This may be achieved by forming (e.g. weaving) the mat with at least three winding fibres to form at least three windings.

Thus the rotor or stator component and/or electric machine may comprise multiple phases such as two or three phase windings.

The winding pattern may comprise a distributed and/or concentrated winding pattern. This may for example comprise wave and/or lap winding.

When the electromagnetic mat is formed, e.g. using weaving, it may be possible to change the dimensions of the mat (e.g. width and/or thickness) and the winding pattern by changing the forming, e.g. weaving, parameters. By changing the dimension and weaving pattern, the properties of the stator or rotor component formed from the electromagnetic mat may be customised as desired. For example the number of poles, the number of turns and whether the winding pattern is parallel or series or a combination thereof may be easily changed even using the same manufacturing machinery.

The forming of the electromagnetic mat may be achieved using an automated and/or continuous manufacturing process. This means that the forming of the electromagnetic mat and hence production of a rotor or stator component of an electric machine may be easy, automatic and/or scalable.

Forming the electromagnetic mat may comprise forming the electromagnetic mat as part of a continuous forming process that is for forming a plurality of electromagnetic mats. This may be achieved by forming a plurality of mats in parallel and/or sequence.

The continuous forming process may comprise cutting the structural fibre lengths and/or winding fibres lengths to allow the plurality of electromagnetic mats to be formed. This cutting process may be to separate one electromagnetic mat from the manufacturing machine before, during or after the forming of the next electromagnetic mat.

The electromagnetic mat may be shaped into a shape for forming a stator or rotor component and/or formed into a rotor or stator component whilst one or more other electromagnetic mats are being produced.

The method may comprise forming (e.g. weaving) the electromagnetic mat as part of a continuous forming process that forms an electromagnetic sheet. The method may comprise dividing (e.g. cutting) the electromagnetic sheet to form the electromagnetic mat (i.e. into sections/lengths) that can each be used to form a rotor or stator component for an electric machine. The sheet may be divided width-ways (i.e. in the direction of the winding fibre lengths/across the structural fibre lengths) or length-ways (i.e. in the direction of the structural fibre lengths/across the winding fibre lengths) to form the electromagnetic mat.

The electromagnetic sheet (which may be formed into a plurality of electromagnetic mats by dividing it) may be rolled up on a base for temporary storage and/or transport before being (e.g. by a machine) unwound and divided to provide an electromagnetic mat that can then be used for forming a stator or rotor component (e.g. formed on a base and/or set etc.).

Dividing the electromagnetic sheet, i.e. the continuous electromagnetic mat, may comprise cutting the structural fibre lengths and/or the winding fibre lengths.

The production parameters, e.g. weaving parameters and fibres, such as winding fibres, used, may change along the length of the sheet. Thus, the sections, i.e. electromagnetic mats, formed by dividing the electromagnetic sheet into sections may have different properties to each other such that they are suitable for use in different electric machines.

The method may comprising forming (e.g. weaving) an electromagnetic mat (i.e. continuous electromagnetic mat), dividing, e.g. cutting, the electromagnetic mat into two or more electromagnetic mats, i.e. electromagnetic mat pieces, and using the two electromagnetic mats to form one or more rotor or stator components of an electric machine.

The electromagnetic mat may be formed continuously, i.e. as part of a continuous manufacturing method. The production parameters may be varied during the production process such that electromagnetic mats with different properties and that are suitable for producing different electric machines and/or multilayer rotor or stator components are produced. The stator or rotor for electrical machine may be formed by the electromagnetic mat. The electromagnetic mat may be rolled up or folded to form the stator or rotor component. The stator or rotor may be used in rotary or linear electric machines.

The method may comprise forming/shaping the electromagnetic mat into a shape for use as at least part of a stator or rotor component of an electric machine. The step of forming the electromagnetic mat into a shape for use as a stator rotor component may comprise orientating the one or more windings in a suitable arrangement for use in the electric machine.

The method may comprise forming a rotor or stator component for an electric machine by rolling the electromagnetic mat (that comprises the winding(s)) to form the stator or rotor component. The electromagnetic mat may be rolled over itself in layers to form the rotor or stator component.

When rolled the structural fibre lengths may extend in a direction around the circumference and/or the winding fibre lengths may extend in an axial direction.

The formed stator or rotor component may comprise a single layer of an electromagnetic mat, multiple layers of a single electromagnetic mat (e.g. formed by rolling or folding an electromagnetic mat up on itself to form multiple layers), multiple layers formed by a plurality of electromagnetic mats laid up on each other and/or one or more electromagnetic mats that each form a fraction of a layer and are combined with other mats to form at least a complete layer.

In the case of a stator or rotor component that is formed by rolling the rotor or stator into layers, the length of the electromagnetic mat (i.e. the dimension broadly in the direction of the structural fibre lengths) may be from a $\frac{1}{100}$ of a layer (meaning angular width of 360 degrees divided into 100 segments) to 100 layers. The length may be from ⅒ of a layer up to 10 layers, or of a length to form 1 to 5 layers. For some applications (where segmented manufacturing is desired) the length of the mat may be from ⅒ of a layer to ½ of a layer.

In the case that the stator or rotor component comprises an electromagnetic mat that forms a fraction of a layer (such as a quarter of a layer), this may be combined with other fractions of electromagnetic mats and/or other mats to form one or more layers.

The windings of the electromagnetic mat may be positioned so that when the electromagnetic mat is rolled up to form multiple layers the windings align between layers. This allows the windings to form the slots of the stator or rotor component.

The winding pattern may be varied along the length of the electromagnetic mat. For example, the distance between windings may increase along its length. Thus, the method may comprise forming the electromagnetic mat with a variable winding pattern along its length. Varying the winding pattern along the length of the mat may be useful when the mat is rolled up in multiple layers to form the rotor or stator component. This is because each layer may be longer than the previous layer such that the winding pattern may need to be adjusted to ensure that the windings between the layers are aligned. The electromagnetic mat may be molded/impregnated with a solidifiable material, for example a curable liquid potting material, such as epoxy/resin. The solidifiable material may be a thermosetting plastic, a thermoplastic, and/or a ceramic slurry for example. The solidifiable material may be solidified by any known process such as curing, heating, freezing, subjecting it to UV-light etc. The solidifiable material once solidified, i.e. once set, may form a solid matrix in which the fibres of the electromagnetic mat are at least partially encapsulated. Thus, the solidifiable material may even be provided on the fibre as a solid material but it is solidifiable in the sense that it can be modified (e.g. melted and re-solidified or cured) to form a solid matrix.

The stator or rotor component may comprise an electromagnetic mat within a solid matrix. This may provide improved properties such as higher mechanical strength, improved heat transfer, etc. for the stator or rotor component.

The method may comprising putting the electromagnetic mat into a mold and setting the electromagnetic mat (i.e. solidifying the solidifiable material) into a shape for the stator or rotor component using the solidifiable material whilst it is in the mold.

The electromagnetic mat when at least partially encapsulated in a solid matrix may be regarded as a composite material.

The impregnated material may be used to set (i.e. lock) the electromagnetic mat in a formed shape for use as a rotor or stator component.

The method may comprise setting, i.e. molding, the electromagnetic mat into a shape for use as a stator or rotor component of an electric machine. The step of setting the electromagnetic mat into a shape for use as a stator rotor component may comprise orientating the windings in a suitable arrangement for use in the electric machine.

The method may provide stator or rotor components for electrical machine that may be used as stator or rotor components in a wide range of applications.

The method may in a simple manner be tailored as regards the design and properties of the electrical machine.

The method may result in lower production costs, both for mass production and low volume products.

The method may enable new electrical machine designs. This may be achieved for example through novel combinations of materials and winding designs.

The method may result in simplified winding for larger electric machines.

The method may simplify production of large electric machines.

The method may be for the production of iron-cored, ironless or slotless stator or rotor components for electrical machines.

The method may be particularly useful for forming radial flux or linear rotors and stators that are ironless and slotless.

The method may be for the production of ironless or slotless stator or rotor components with increased/improved thermal properties.

The method may be for the production of very thin iron-cored, ironless or slotless stator or rotor components for electrical machines. The forming of the rotor or stator component using the electromagnetic mat may allow the component to have a high winding fill factor. This is because the structural fibres/structural fibre lengths may be very thin so the winding fibres may present the majority of the volume of the electromagnetic mat.

The disclosed embodiments may provide a novel production method for stator or rotor components with improved electromagnetic, mechanical and/or thermal properties compared to known production methods for rotor or stator components.

Electromagnetic properties may for example be electrically conductive, insulating, magnetic, etc. properties.

The method of production of a rotor or stator component of an electric machine may comprise an initial step of forming (e.g. weaving, twining, winding, braiding or knitting) the electromagnetic mat comprising structural fibre lengths (e.g. at least two fibre warps with non-conductive surface) in a first direction (e.g. longitudinal direction) of the electromagnetic mat and at least one winding formed by: at least one winding fibre (e.g. continuous electrical conductor fibre weft) extending mainly in a second direction (e.g. transversal direction) of the electromagnetic mat, wherein the at least one winding fibre is aligned in a winding pattern so as to create a moving electromagnetic field when induced with an alternating current or constant electromagnetic field when induced with direct current.

The at least one winding fibre (e.g. continuous fibre weft) may be formed from discrete winding fibre lengths (e.g. cut electrical conductor (i.e. electrically conductive) fibre wefts) extending in mainly the second direction, e.g. transversal direction, of the electromagnetic mat and connected at end windings to create the at least one winding fibre.

The winding fibre may be provided by forming the electromagnetic mat with a continuous winding fibre that is extended back and forth across the structural fibre lengths to provide the plurality of fibre winding lengths. For example, during manufacture of the electromagnetic mat, the continuous winding fibre may be extended across the structural fibre lengths to create a first winding fibre length extending in the second direction, the continuous winding fibre may then be turned back on itself and extended back across the structural fibre lengths in the opposite direction across the structural fibre lengths to create a second winding fibre length. This process of extending the continuous winding fibre back and forth across the structural fibre lengths may be repeated a plurality of times to form a plurality of winding fibre lengths across the structural fibre lengths and so as to form the winding pattern. As the winding fibre length is passed back and forth across the structural fibre lengths the winding fibre may be interwoven with the structural fibres/structural fibre lengths to lock the winding fibre into the winding pattern.

The winding fibre may be provided by forming the electromagnetic mat with a plurality of discrete winding fibre lengths. During manufacture each discrete winding fibre length may be extended across the structural fibre lengths and may be locked in place by the structural fibre lengths. Following this the ends of the discrete structural fibre lengths may be joined so as to form a continuous winding fibre that is aligned in a winding pattern.

The structural fibre lengths may be arranged so that they do not result in any electrical short circuits in the electromagnetic mat. This may be achieved by the structural fibre lengths having a non-conductive surface (either by being formed of one or more non-conductive materials or if the structural fibres do comprise conductive material, the surface of one or more or each fibre being at least partially covered with a non-conductive material) or by the fibres being arranged so that in use they do not contact any other conductive current carrying fibres or surfaces. This may be achieved by the spacing of the structural fibre lengths and/or providing insulating material at any contact points with a conductive material.

The structural fibres may be, comprise and/or be formed from synthetic (including semi-synthetic fibres) and/or natural fibres. The structural fibres may be, comprise and/or be formed from polyester, polyamide, nylon, polyethylene terephthalate or natural fibres such as form plants, animals or geological processes etc.

The structural fibre lengths may have a circular cross section, or a flat cross section. The structural fibre may be flexible. Each structural fibre may be a bundle of individual strands.

For structural fibre with a circular, or roughly circular cross section, the diameter may be from 1 micron to 10 mm, 10 microns to 3 mm or 50 microns to 1 mm for example.

For structural fibres with a flat cross section the width of the fibres may be from 1 micron to 3 meters, 10 micrometers to 1000 mm, or 50 micrometers to 100 mm, for example.

The density of structural fibre lengths (where each structural fibre length may be formed from one or a plurality of strands) in the electromagnetic may be between 0.001 and 10 structural fibres per mm. The density of structural fibres will depend on a number of factors such as the forming, e.g. weaving, process used and/or the desired mechanical properties etc.

The density of the structural fibre lengths will depend on factors such as the desired strength, weight and/or winding fill factor.

The structural fibre length and/or winding fibre lengths density of the electromagnetic mat may be from 10,000 to $1/100$ fibers per centimetre of the electromagnetic mat (e.g. in the active area), or from 100 to $1/10$ fibre per centimetre or 50 to 1 fibre per centimetre, for example.

The winding fibre lengths may be formed of a material that is suitable for forming the windings of an electric machine. The winding fibre lengths may be made of or comprise a material that results in an electromagnetic field when a current is applied to the fibre lengths.

The winding fibre lengths may comprise and/or be formed from an electrical conductive material such as copper, aluminium, silver, gold, and bronze etc. The winding fibre lengths may comprise an electrically conductive material insulated by an electrically insulating material. For example, the winding fibre lengths may comprise a conductive material such as copper coated with an insulating material such as polyurethane. The winding fibre lengths may be Litz wire, such as Type 1, Type 2 and/or Type 3 Litz wire etc., solid wire and/or bare wire. The fibres may be insulated fibres, for example if the wire is Litz wire, the fibre may be an insulated Litz wire.

The winding fibre lengths may have a circular or rectangular cross section. The winding fibre lengths may, however, be flexible such that the cross sectional shape is not rigid.

Each winding fibre may comprise one or more strands that together form the winding fibre.

The structural fibres may each comprise a non-conductive surface and/or the winding fibre lengths may each comprise an electrical conductor.

The structural fibre lengths and the winding fibre lengths may be different types of fibres. For example, they may be made from different materials and have different sizes and geometries. This is due to the different purpose of these fibres; namely the winding fibres are for forming one or more windings of an electric machine and the structural fibres are for supporting and/or locking the winding fibres in place in the mat.

The winding fibre lengths may be thinner, the same thickness as, or thicker than the structural fibre lengths. If the winding fibres are thicker than the structural fibre lengths, the winding fibre lengths may be at least twice as thick as (e.g. have a diameter that is at least double the diameter of) the structural fibre lengths. The winding fibre lengths may be at least 10 times, 100 times, 1000 times, 5000 times or 10,000 times thicker than (e.g. have a diameter that is at least 10, 100, 1000, 5000 or 10,000 times greater than the diameter of) the structural fibre lengths.

The structural fibre lengths with non-conductive surface may be formed by a conductive core with an insulating layer or be formed by a non-conductive material or several non-conductive materials or be formed by one or more non-conductive materials together with one or more conductive materials.

The term transversal direction may not be limited to perpendicular direction, but may also cover that the winding fibre lengths extend with a direction deviating from the perpendicular direction.

The fibres may be any material or materials that can be formed to a long thread. The fibres (structural fibres, winding fibres and/or property modifying fibres, if present) may be single strand and/or multi strand fibres. The fibres may also be and/or referred to as yarns, threads, strands, wires, bars etc.

The electromagnetic mat may comprise at least one property modifying fibre length. The at least one property modifying fibre length may have one or more properties that are different to the structural fibre lengths and/or the winding fibre lengths.

The property modifying fibre lengths may extend in the first direction, second direction and/or a different direction.

The property modifying fibre lengths (if present) may be incorporated into the electromagnetic mat when the winding fibres are being inserted, and/or at a later stage in the process. The property modifying fibre lengths may be alternated and/or interspersed with the winding fibre lengths. The electromagnetic mat may have regions with a plurality of winding fibre lengths interspersed between regions with a plurality of property modifying fibre lengths. The regions with winding fibre lengths may provide poles of the stator or rotor component and the regions therebetween may be filled with property modifying fibres that modify and/or enhance the properties of the stator or rotor component (the property modifying fibres may thus be referred to as property enhancing fibres). For example the property modifying fibres may help guide flux in the stator or rotor component, may help dissipate heat, may help strengthen the stator or rotor component, may act as an electrical insulator etc. Thus the property modifying fibre lengths may be chosen for their electromagnetic, thermal, mechanical and/or electrical properties.

The property modifying fibre lengths may be, comprise or be formed from any materials that can be produced as a fiber. The materials include natural fibers such as animal-based fibers, plant-based fibers and mineral-based fibers, synthetic fibers, optical fibers, and nanotubes and nanowires. Further examples include silk, wool, cotton, fibreglass, copper, gold, steel, iron, kevlar, nylon, polyester, carbon fibre, and spandex. The material of the property modifying fibre lengths will depend on the property it is desired to modify by the inclusion of the fibre. This may for example be cost, weight, strength, softness, thermal conductivity, electrical conductivity, permeability, elasticity, thickness, durability, chemical properties, electrical properties, and flame resistance.

Each property modifying fiber may comprise a plurality of strands bundled together. The strands in a property modifying fibre may be different materials.

The property modifying fibre lengths may be connected to the structural fibre lengths and/or the winding fibre lengths before the mat is formed and/or may be inserted as individual fibres. Thus the method of producing the mat may comprise forming the fibre lengths for forming the mat by combining property modifying fibres with the structural fibre lengths and/or winding fibre lengths to form modified structural fibre lengths and/or modified winding fibre lengths. The method may comprise forming (e.g. weaving) the electromagnetic mat using the modified structural fibre lengths and/or the modified winding fibre lengths.

For example, the property modifying fibre lengths may be iron fibres and may be arranged in the electromagnetic mat so as to form iron teeth or back iron when the electromagnetic mat is formed into a rotor or stator component.

The property modifying fibre lengths may comprise fibres that are made of different materials. Each fibre length may be made from a plurality of different materials and/or there may be a plurality of fibre lengths which are made from a variety of different materials to each other.

The property modifying fibre lengths may each be formed from discrete fibres and/or the property modifying fibre lengths may be formed from a continuous property modifying fibre extending back and forth through the mat in the same manner as the winding fibre lengths and structural fibre lengths discussed above.

The property modifying fibre lengths may have certain (selected) electrical, mechanical and/or thermal properties that result in the rotor or stator component having modified properties compared to a component without these fibres.

The property modifying fibres may be used to form a mat without winding fibres. This may be referred to as a property modifying mat. This mat may or may not comprise structural fibres.

The property modifying mat may be used with the electromagnetic mat to form the rotor or stator component. For example, the property modifying mat may be placed between layers of the electromagnetic mat to form the rotor or stator component and/or between sections of the electromagnetic mat.

The property modifying mat may be integrally formed with the electromagnetic mat. This may for example be part of a continuous forming process. For example, a first portion may be formed (e.g. woven) with winding fibre lengths to form an electromagnetic mat and in a continuous manner a second portion may be formed (e.g. woven) with property modifying fibres and no winding fibre lengths to form a property modifying mat that is integral with the electromagnetic mat for forming the at least one winding. After this, optionally again as part of the continuous process, the winding fibres may be used to form an electromagnetic mat with one or more windings. This process of forming may be repeated so as to create a mat with alternating property modifying regions and electromagnetic regions for forming the windings. The dimensions of the alternating regions/mats may be designed so as to form the desired properties when the stator or rotor component is formed from the mat. For example the dimensions of each region may be selected so that these regions align with each other when the mat is folded or rolled up into multiple layers to form the stator or rotor component.

The property modifying mat may form one or both ends of the mat.

The property modifying mat and electromagnetic mat may be formed separately and combined to form the rotor or stator component. The electromagnetic mat may comprise additional fibre lengths (i.e. non-winding fibre lengths) in the second direction and/or a direction different to the first direction. These additional fibre lengths may be alternated with the winding fibre lengths. These additional fibre lengths may be the above discussed property modifying fibre lengths.

The method may comprise forming (e.g. weaving, twining or winding) the mat with at least one or more additional fibres (e.g. property modifying fibres). The method may comprise weaving, twining or winding alternating structural fibre lengths and/or property modifying fibre lengths with mechanical, electromagnetic and/or thermal properties and winding fibre lengths in transversal direction of the electromagnetic mat. By this the mechanical, electromagnetic and/or thermal properties of the electromagnetic mat and thus stator or rotor component can be altered/tailored to exhibit desired properties.

The electromagnetic mat may thus comprise three types of fibres; structural fibres for supporting the mat and fibres thereof, winding fibres for forming the windings of the electric machine, and property modifying fibres for tailoring the properties of the electromagnetic mat and/or rotor or stator component. The property modifying fibres of the electromagnetic mat may be fibres of the mat that are not the structural fibres or the winding fibres.

The method may comprise a step of impregnation of the electromagnetic mat with a solidifiable material. The solidifiable material may for example be a curable liquid potting material, such as epoxy or resin. If performed, the steps of impregnating the electromagnetic mat with the solidifiable material and/or solidifying the solidifiable material may be performed at different stages of the production process.

The winding fibre may be a continuous fibre. This may mean that there is electrical continuity along the fibre so that the winding fibre can act as a winding when the machine is in use. The continuous winding fibre may be provided by forming the mat using a continuous fibre that is directed back on itself backwards and forwards along the second direction to provide the plurality of fibre lengths. Thus the winding fibre which comprises a plurality of winding fibre lengths may be a continuous fibre that provides the lengths.

Additionally or alternatively the winding fibre may be formed from a plurality of discrete fibre lengths (e.g. cut fibres lengths) that are joined together to form the winding fibre. The method may comprise a step of connecting the ends of the discrete fibre lengths (e.g. end windings of the cut electrical conductor fibre wefts), so to create one or more continuous winding fibres (e.g. continuous electrical conductor fibre wefts). This may be used to create different winding pattern designs. This step may be performed at different stages of the production process (e.g. at any stage during manufacturing or assembling).

The electromagnetic mat may comprise an active area. The active area may be the area of the electromagnetic mat between the outermost two structural fibres. The active area may be the area of the electromagnetic mat between the ends of the winding fibres lengths where the winding fibres change direction. The active area may be the area where the winding fibre lengths extend in at least broadly the same direction.

In the case of an electromagnetic mat formed with a continuous winding fibre that is turned back on itself to form the winding fibre lengths, the active area may be the area where the winding fibre lengths extend in at least broadly the same direction between the outer ends where the winding fibre turns back on itself. In the case of an electromagnetic mat formed by discrete fibre lengths that are electrically connected together, the active area may be the area where the winding fibre lengths extend in at least broadly the same direction between the outer ends where the winding fibre lengths are connected.

The method may comprise a step of rolling the electromagnetic mat in one or multiple layers on a base (e.g. object), and/or folding the electromagnetic mat in multiple layers to form a desired geometrical shape for the rotor or stator component.

The electromagnetic mat may be rolled onto a cylindrical base. In this case the electromagnetic mat may be rectangular.

The width of the base (e.g. dimension in the axial direction), may be the same as, narrower and/or wider than the width of the electromagnetic mat.

The width of the electromagnetic mat (e.g. the width between the outermost structural fibres on each side) may be equal to the width of the base.

The base may have a diameter of 500 micrometers (e.g. for nano-motors) up to 30 m (e.g. for wind turbines) for example, most applications may have a base with a diameter from 5 mm to 5 meters, or 10 mm to 1 meter for example.

One end of the electromagnetic mat may be connected to the base and then the electromagnetic mat may be rolled around the base. For example, ends of one or more of all of the structural fibre lengths of the electromagnetic mat may be fixed to the base before the mat is rolled around the base.

The method may comprise forming the electromagnetic mat whilst it is connected to the base. The electromagnetic mat may be rolled onto the base as it is formed.

The method may comprise connecting the ends of the structural fibre lengths to the base, forming the support structure and then inserting the winding fibre lengths into the support structure to form the electromagnetic mat as it is rolled onto the base. Once a sufficient length of electromagnetic mat is rolled onto the base, the structural fibres may be cut and the mat secured to the base. The cut ends of the structural fibres may then be connected to a second base and the process repeated to form another stator or rotor component. This method may be performed continuously.

The geometry of the rotor or stator component formed from the electromagnetic mat may be determined at least in part by the geometry of the base on which the electromagnetic mat is shaped. Thus the geometry of the rotor or stator component may be changed by shaping the electromagnetic mat on a base that has a different geometry.

The geometry of the rotor or stator component may alternatively or additionally be determined based on the thickness of the mat (which may be determined based on the dimensions of the fibres used and the forming, e.g. weaving, process used) and/or the number of layers formed by rolling the mat onto itself.

The inner diameter of the electromagnetic mat of the stator or rotor component may be determined by the outer diameter of the base.

The outer diameter of the stator or rotor component (and hence the thickness of the rotor or stator component) may be determined by the thickness of the electromagnetic mat and the number of layers of the mat used to form the stator or rotor component. Given that the thickness of the mat and/or the number of layers may be varied the outer diameter of the stator or rotor component may be varied as desired.

Thus the inner and outer diameter of the electromagnetic mat shaped to form the stator or rotor component may be easily tailored depending on the intended application.

The method may comprise using a rotor or stator mold to ensure the shape of the stator or rotor component formed from the electromagnetic mat may be maintained during shaping and/or setting of the electromagnetic mat. For example, the method may comprise using an outer mold that has an inner diameter equal to the desired outer diameter of the stator or rotor component. The mold may be used to ensure that the mat is formed into the correct shape by applying pressure to compress the layers to form the rotor or stator component.

The structural fibres may be used to control and/or adjust the shape of the formed rotor or stator component. For example, tension may be applied to the structural fibres, e.g. in a circumferential direction, so as to compress the layers and hence control the outer diameter of the rotor or stator component formed from the electromagnetic mat. The tension on the structural fibres may act to pull the mat in radially so as to control the outer diameter of the rotor or stator component.

Once the electromagnetic mat is formed into a shape for the rotor or stator component, the shape may be secured using structural fibres. For example, there may be additional lengths of structural fibres (e.g. lengths that are not interwoven with other fibres) at one end of the electromagnetic mat that may be wound around the rolled up electromagnetic mat so as to secure it in place. This securing may be a temporary measure before the mat is set in shape with a solidifiable material.

Thus the final geometry of the rotor or stator component may be easily customised for a particular application. The base (e.g. object) may be part of the rotor or stator component. Thus the electromagnetic mat may remain formed on the base even when it is in an electric machine. Alternatively the base may be removed once the electromagnetic mat has been formed, i.e. the base may act only as a mold for shaping the mat and not a component of the electric machine.

In the case that the base is used as a mold and is not intended to be part of the rotor or stator component, the base may be formed of any material that allows the electromagnetic mat to be molded thereon.

In the case that the base is part of the rotor or stator component the base may be formed of any material suitable for incorporation into the rotor or stator component.

The base may be made of and/or comprise plastic, composite, ceramic and/or metal etc.

The base may have a surface which is electrically insulating. This may be achieved by forming the base from an insulating material and/or covering, e.g. coating, the base with an insulating material. This may help prevent short circuits.

The base may be formed from a magnetic flux carrying material such as electrical steel, iron or a soft magnetic compound (SMC). Use of such material for the base may be desirable in the case of a slotted or slotless electric machine.

In the case of an ironless electric machine the base should not have magnetic flux carrying properties or, if it does, the base should be removed after the mat is shaped so that the base is not included in the electric machine.

The base may be used to shape the electromagnetic mat, modify the properties of the rotor or stator component (e.g. by being a material and shape to guide magnetic flux) and/or support the mat in the desired shape after it has been set with a solidifying material.

The base may comprise an integrated circuit board and/or be for supporting an integrated circuit board. The method of producing the rotor or stator component may comprise connecting one or more winding fibres to a circuit board.

The method may comprises forming (e.g. weaving, twining or winding) the electromagnetic mat with at least two windings. Each winding may be formed by a separate winding fibre.

The method may comprise weaving, twining or winding the electromagnetic mat with at least two windings formed by winding fibre lengths. Accordingly, a stator or rotor component according to the disclosure can be formed with at least two windings appropriately connected in serial and/or parallel to provide a desired winding pattern. The number of windings may be more than two such as three or more.

The electromagnetic mat (e.g. before it is shaped for the stator or rotor component) may be rectangular (including square), in the shape of a trapezium, a parallelogram, a rhombus, a triangle or polygons, arc-shaped, circular, S-shaped, 8-shaped, helical etc. The electromagnetic mat may be elongate.

In the case of radial flux or linear rotor or stator components the electromagnetic mat may be produced in a rectangular shape.

The structural fibre lengths may each be the same length. Alternatively, one or more or each of the structural fibre lengths may have different lengths. The lengths of the structural fibre lengths and/or the tension applied to the structural lengths may dictate the resulting shape of the electromagnetic mat. For example, the lengths of the structural fibre lengths may result in the electromagnetic mat forming a circular, S-shaped, 8-shaped, helical electromagnetic mat or other desired shapes.

The method may comprise weaving, twining or winding the electromagnetic mat with structural fibre lengths with non-conductive surface of different lengths so as to form a circular, S-shaped, 8-shaped, helical electromagnetic mat or other desired shapes.

The method may comprise weaving, twining or winding the electromagnetic mat with both structural fibre lengths with non-conductive surface and winding fibre lengths, and property modifying fibres, if present, with mechanical, electromagnetic and/or thermal properties. By this an electromagnetic mat with varied properties may be achieved.

The fibres (e.g. the structural fibre lengths, the winding fibre lengths and/or property modifying fibre lengths) of the electromagnetic mat may extend in one, two or three dimensions. For example, one or more or each fibre length may extend in the first direction, the second direction, a third direction in the same plane as the first and second directions and/or a fourth direction out of the plane of the first and second direction.

The method may comprise weaving, twining or winding the electromagnetic mat with structural fibre lengths with non-conductive surface, winding fibres and/or property modifying fibres with mechanical, electromagnetic and/or thermal properties extending in at least one dimension, two dimensions or three dimensions.

The method (e.g. step of forming the electromagnetic mat or step of forming the rotor or stator component) may comprise incorporating one or more objects, in the electromagnetic mat and/or within the rotor or stator component, e.g. between layers of the electromagnetic mat or mats. The object may be used to enhance the thermal, electromagnetic and/or mechanical properties of the rotor or stator component compared to a rotor or stator component without the object. The object may for example be insulating material, e.g. insulating paper, magnets, solidifiable materials, e.g. epoxy and/or curable or freezable materials, other material layers, sensors, optical fibres or cooling devices (e.g. cooling pipes or wires) etc.

For example, if the method comprises weaving the structural fibre lengths and winding fibre lengths, the objects may be incorporated into the electromagnetic mat by weaving them into the fibres. This may be prior, simultaneously or after the winding fibre lengths are woven into the structural fibre lengths. If the method comprises forming the rotor or stator component by layering the electromagnetic mat onto itself (e.g. rolling it up), the objects may be incorporated within the electromagnetic mat and/or rotor or stator component by providing the object between layers of the electromagnetic mat.

The method may comprise arranging objects, such as magnets or pipes, in the electronic mat (i.e. the electromagnetic mat). For example water pipes can be arranged for improved cooling properties.

The method may comprise a step of forming the electromagnetic mat into a rotor or stator component. For example, the method may comprise a step of forming the electromagnetic mat to a shape of a rotor or stator component. The method may comprise molding/encapsulating/impregnating/solidifying the formed electromagnetic mat with a solidifiable material, e.g. a curable liquid potting material, such as epoxy/resin.

The rotor or stator component of an electric machine may be formed by an electromagnetic mat (e.g. woven, twined or wound electromagnetic mat) consisting of at least two structural fibre lengths (e.g. fibre warps with non-conductive surface) extending in a first direction (e.g. longitudinal direction) of the electromagnetic mat and at least one winding formed by at least one winding fibre, wherein the at least one winding fibre comprises a plurality of winding fibre lengths, (wherein the at least one winding fibre may be at least one continuous electrical conductor fibre weft extending in mainly transversal direction of the electromagnetic mat, or cut electrical conductor fibre wefts extending in mainly transversal direction of the electromagnetic mat and connected at end windings to create at least one continuous conductor fibre weft), wherein the winding fibre (e.g. at least one continuous electrical conductor fibre weft) is aligned in a winding pattern creating a moving electromagnetic field when induced with an alternating current or constant electromagnetic field when induced with direct current.

Accordingly, by connecting the at least one winding to an AC or DC power source a moving (e.g. oscillating) or constant, respectively, magnetic field may be created. Further, when brushes are used, DC current may be applied to create an AC current.

The one or more winding fibres may be for connection or connected to a power source, i.e. a source of electricity. The winding fibre may be in a pattern such that when a current is passed through the winding a magnetic field is created so as to operate the electric machine.

The electric machine may comprise a power source that is connected to the one or more windings of the electromagnetic mat.

The stator or rotor component may be an iron-cored, slotless or ironless stator or rotor component.

The electromagnetic mat may be woven, twined or wound with alternating non-conductive property modifying fibres and/or property modifying fibres with mechanical, electromagnetic and thermal properties (i.e. property modifying fibre wefts) and/or cut or continuous winding fibres (i.e. electrical conductor wefts) in transversal direction of the electromagnetic mat. In this way the stator or rotor component may have additional properties. The stator or rotor component may comprise iron teeth, back iron and/or similar.

The electromagnetic mat may be impregnated with a solidifiable, e.g. curable liquid potting material, such as epoxy or resin. This may be performed at different stages in the production process.

The electromagnetic mat may comprise both structural fibre lengths with non-conductive surface and structural fibre lengths with mechanical, electromagnetic and/or thermal properties. Thus the stator or rotor component may have for example enhanced thermal properties.

The electromagnetic mat may be rolled or folded in one or multiple layers to form a desired geometry for the rotor or stator component.

The electromagnetic mat may be formed to a shape of a rotor or stator component. The electromagnetic mat may be molded/encapsulated/impregnated/set with a solidifiable material, e.g. curable liquid potting material, such as epoxy or resin, thermosetting plastic, a thermoplastic or a ceramic slurry etc. The shape of the formed electromagnetic mat may be maintained and/or strengthened when the solidifiable material is solidified.

The electromagnetic mat may comprise at least two, at least three or more, windings, formed by winding fibres (e.g. formed by connected cut electrical conductor fibre wefts or continuous electrical conductor fibre wefts).

The structural fibres (e.g. fibre warps with non-conductive surface) may each have a different length. This may cause the electromagnetic mat to be circular, arc-shaped, S-shaped, 8-shaped, or helical shaped electromagnetic mat etc.

The electromagnetic mat may comprise objects, such as magnets or pipes. E.g. water pipes can be arranged for improved cooling properties. The objects may be interwoven with the fibres of the electromagnetic mat and/or be located between layers of the electromagnetic mat when it is formed into a shape to provide the stator or rotor component.

Forming a stator or rotor component from an electromagnetic mat may improve the mechanical strength and/or reduce the weight of the rotor or stator component compared to a component formed with windings formed by a traditional method.

The stator or rotor components formed from the electromagnetic mat may be smaller (e.g. thinner) than rotor or stator components formed by a traditional method which require a body around which the windings (e.g. copper wires) are wound.

The rotor or stator may be a radial flux rotor or stator, axial flux rotor or stator, or a linear rotor or stator.

The terms electric machine and electrical machine may be used herein interchangeably. The electric machine may be a machine that uses electromagnetic forces, such as electric motors, electric generators etc. The electric machine may be an electromechanical energy converter such as an electric motor that converts electricity to mechanical power and/or an electric generator that converts mechanical power to electricity.

Rotor may mean a component that in use moves. This may be by rotation and/or linear motion along a specified path. The rotor may be moved by electromagnetic forces from a stator and/or by external forces so as to induce a voltage in the stator.

The term "fibre" and "fiber" are intended to mean the same and may be used herein interchangeably. Further preferable features and advantageous details of the disclosed embodiments will appear from the following example description, claims and attached drawings.

[0207.01] Another non-limiting embodiment of the invention includes a method of producing an electromagnetic mat for forming a stator or rotor component of a multiphase ironless or slotless electric machine, wherein the electromagnetic mat comprises non-conductive structural fibre lengths and a plurality of continuous winding fibre lengths for forming winding fibres that are in a winding pattern for forming multiple windings of the multiphase ironless or slotless electric machine. The method comprises (a) forming a support structure with the non-conductive structural fibre lengths and (b) inserting the continuous winding fibre lengths into the support structure so that the continuous winding fibre lengths extend across the structural fibre lengths and the structural fibre lengths lock the continuous winding fibre lengths in position to form the electromagnetic mat, wherein the inserting the continuous winding fibre lengths into the support structure comprises weaving the continuous winding fibre lengths back and forth across the structural fibre lengths and aligning the continuous winding fibre lengths in a winding pattern so as to create a moving electromagnetic field when induced with an alternating current or a constant electromagnetic field when induced with direct current.

[0207.02] The method may include that the electromagnetic mat is formed with additional fibre lengths having predetermined electromagnetic, thermal, mechanical and/or electrical properties.

[0207.03] The method may include a step of shaping the electromagnetic mat into a shape for forming at least a part of the stator or rotor component of the electric machine.

[0207.04] The method may include the step of shaping the electromagnetic mat is performed on a base or by layering the electromagnetic mat onto itself to form the stator or rotor component.

[0207.05] The method may include shaping the electromagnetic mat by arranging or rolling the electromagnetic mat onto the base.

[0207.06] The method may include a step of connecting at least one of the structural fibre lengths to the base before the electromagnetic mat is rolled onto the base.

[0207.07] The method may include a step of forming the stator or rotor component with the base as a part of the stator or rotor component.

[0207.08] The method may include a step of incorporating an object within the rotor or stator component by providing the object between layers of the electromagnetic mat.

[0207.09] The method may include a step of impregnating the electromagnetic mat with a solidifiable material, and solidifying the solidifiable material to set the electromagnetic mat in the shape for forming the stator or rotor component.

[0207.10] The method may include that the electromagnetic mat is formed as part of a continuous forming process that is for forming a plurality of electromagnetic mats, and wherein the method comprises cutting the structural fibre lengths to form the electromagnetic mat for forming the stator or rotor component of an electric machine.

[0207.11] The method may include a step of shaping the electromagnetic mat into a shape for forming at least a part of the stator or rotor component of the electric machine, wherein the step of shaping the electromagnetic mat is performed before the step of cutting the structural fibre lengths.

[0207.12] The method may include that the electromagnetic mat is performed using a machine that is controllable to allow adjustment of one or more of a winding pattern and dimensions of the electromagnetic mat.

[0207.13] Another non-limiting embodiment of the invention includes an electromagnetic mat for forming a stator or rotor component of a multiphase ironless or slotless electric machine, comprising non-conductive structural fibre lengths that form a support structure and a plurality of continuous winding fibre lengths forming winding fibres that is in a winding pattern for forming multiple windings of the multiphase ironless or slotless electric machine, wherein the continuous winding fibre lengths have been woven into the support structure so that the continuous winding fibre lengths extend back and forth across the structural fibre lengths and the structural fibre lengths lock the continuous winding fibre lengths in position, and wherein the continuous winding fibre lengths are aligned in a winding pattern configured to create a moving electromagnetic field when induced with an alternating current or a constant electromagnetic field when induced with direct current.

[0207.14] The electromagnetic mat may include property modifying fibre lengths in the electromagnetic mat, said property modifying fibre lengths having predetermined electromagnetic, thermal, mechanical and/or electrical properties.

[0207.15] The electromagnetic mat may include the structural fibre lengths extending in a longitudinal direction of the electromagnetic mat and the winding fibre lengths extend in mainly transversal direction of the electromagnetic mat.

[0207.16] The electromagnetic mat may be shaped to form a stator or rotor component of an electric machine.

[0207.17] The electromagnetic mat may be shaped by being arranged or rolled onto a base or layered onto itself.

[0207.18] The base may be a part of the stator or rotor component.

[0207.19] The electromagnetic mat may include an object incorporated within the rotor or stator component, wherein the object is between layers of the electromagnetic mat.

[0207.20] The electromagnetic mat may include a solidifiable material impregnated into the electromagnetic mat, wherein the solidifiable material is solidified to set the electromagnetic mat in the shape for forming the stator or rotor component.

BRIEF DESCRIPTION OF THE DRAWINGS

Certain embodiments of the present invention will below be described by way of example only with references to the attached drawings, where:

FIG. 15 shows the production of electromagnetic mats for four machines at the same time, and FIGS. 16A-16C show the production of an electromagnetic mat by means of twining.

DETAILED DESCRIPTION

Figure 1:
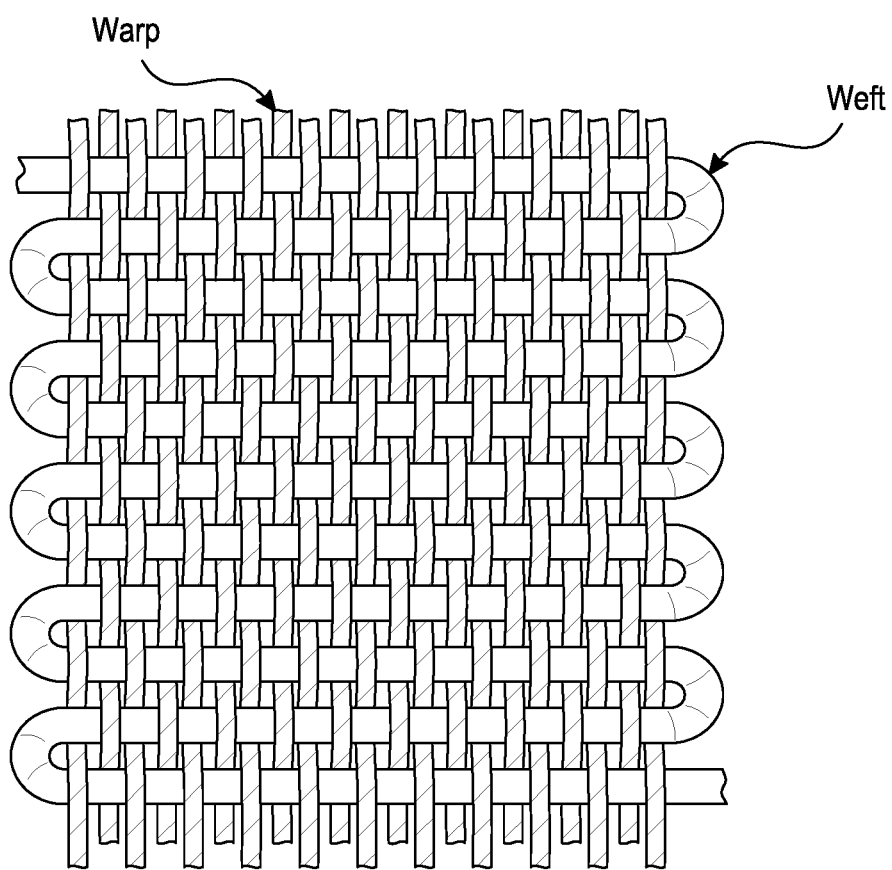
FIG. 1 shows a woven mat.

Reference is now made to FIG. 1 which shows a woven mat according to prior art. A woven mat is formed by fibres extending in longitudinal direction (i.e. a first direction) of the mat (X-fibres) called warps, and fibres extending in transversal direction (i.e. a second direction) of the mat (Y-fibres) called wefts. There exists different types of weaving which can be utilized to form such a woven mat, these include percale, twill, satin, sateen, LENO, Dutch, etc.

The disclosed embodiments may be based on using weaving for the production of stator or rotor components of rotary or linear electric machines. This may be achieved by production of a woven electromagnetic mat 10.

As shown in FIGS. 2A-2E for example there is provided a 2D electromagnetic mat 10 with structural fibres 20 extending in a first direction (e.g. fibre warps with non-conductive surface extending in longitudinal direction) of the electromagnetic mat and at least one winding formed by at least one winding fibre that comprises a plurality of winding fibre lengths 30, wherein each winding fibre length extends in a second direction of the electromagnetic mat. The winding fibre may be a fibre weft. For example, the winding fibre may be at least one continuous electrical conductor fibre weft extending mainly in transversal direction of the electromagnetic mat (as shown for example in FIGS. 6B, 8 and 12) or discrete (e.g. cut) electrical conductor fibre wefts extending in mainly transversal direction of the electromagnetic mat and connected (e.g. at end windings) to create at least one continuous conductor fibre weft (as shown in FIG. 3A for example). The at least one continuous electric conductor fibre weft or cut electrical conductor fibre weft is formed by electrical conductors.

The winding fibre, e.g. the at least one continuous electrical conductor fibre weft, is aligned in a winding pattern that creates a moving electromagnetic field when induced with an alternating current or a constant electromagnetic field when induced with direct current from a power supply source.

The winding pattern formed by the winding fibre (e.g. electrical conductor fibre weft pattern) can be adapted/modified/tailored according to different applications requiring different motor designs.

For rotary machines, e.g. rotating motors, the electromagnetic mat 10 can according to one embodiment be rolled up on an object 50 (e.g. a base) (as shown for example in FIG. 6B), that may for example be a cylindrical shape. The electromagnetic mat is formed into the shape for the rotor or stator component. The electromagnetic mat 10 is cast/molded/impregnated with a solidifiable material (e.g. curable liquid potting material, such as resin or epoxy, thermosetting plastic, thermoplastic and/or a ceramic slurry etc.). The stator or rotor component may be removed from the object 50 (e.g. base) (as shown in FIG. 6C for example) or the object may form part of the stator or rotor component (as shown in FIG. 6B for example). The stator or rotor component may be assembled with the other electric machine, e.g. electric motor, components.

As will be described in further detail below the electromagnetic mat may comprise property modifying fibres, i.e. fibre warps, with particular mechanical, electromagnetic and/or thermal properties.

The structural fibres and/or property modifying fibres (e.g. the fibre warps with non-conductive surface and/or fibre warps with particular mechanical, electromagnetic and/or thermal properties) are fibres (i.e. threads) with particular mechanical, electromagnetic and/or thermal properties, e.g. fiberglass, Kevlar, carbon fiber, or similar, and can be in any form (such as flat, circular etc.) and any size (e.g. various diameters, length and/or width) depending on the application. Accordingly, the structural fibres and property modifying fibres may be formed from materials suitable for forming a support structure such as a grid (e.g. a single- or multi-dimensional grid/mesh). The electromagnetic mat may comprise a single type of structural fibre, or a mix of different types of fibres. The number of structural fibre lengths (i.e. warps) with non-conductive surface in the electromagnetic mat may be at least two.

The structural fibres (i.e. fibre warps with non-conductive surface (and possibly fibre warps with other mechanical, electromagnetic and/or thermal properties)) will keep the winding fibre lengths (e.g. electrical conductor fibre wefts) in place in the electromagnetic mat by acting as a supporting grid. The electromagnetic mat may also comprise property modifying fibres (i.e. fibre wefts with mechanical, electromagnetic and/or thermal properties) which will be supported in the same manner as the winding fibre lengths. The property modifying fibres may also be referred to as non-winding fibres because they are not used to form windings of the electrical machine.

One or more or all fibres (e.g. warps and wefts) in the electromagnetic mat may contribute to mechanical support, as well as thermal and/or electromagnetic properties of the electromagnetic mat and/or rotor or stator component.

The winding fibres (e.g. electrical conductor fibre wefts) may be conductive fibres, e.g. made of copper, aluminum, or other conductive materials, as threads or fibres.

In the case that discrete (e.g. cut) winding fibre lengths (e.g. electrical conductor fibre wefts) are used to form the at least one winding, the discrete winding fibre lengths arranged in the electromagnetic mat may have ends outside of the electromagnetic mat's width, i.e. outside the grid formed by the structural fibres (e.g. warps with non-conductive surface and possibly warps with mechanical, electromagnetic and/or thermal properties). The ends may be connected by desired connectors to form one or more winding fibres, e.g. continuous electrical conductor fibre warps, as described above.

The winding fibres (e.g. electrical conductor fibre wefts) may have any geometrical form (e.g. flat/circular/other) and any size (i.e. any diameter, length and/or width). The particular geometry and size of the fibres may be based on the desired design of the stator or rotor component, and/or general requirements of the windings of the electric machine.

Figure 2A:
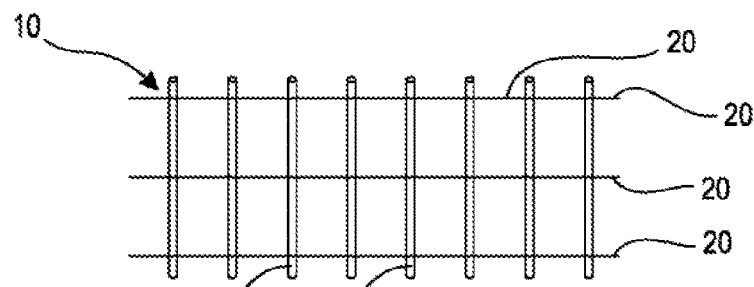
FIGS. 2A-2E show electromagnetic mats (i.e. mesh fibre structures) for a stator or rotor component.
Figure 2B:
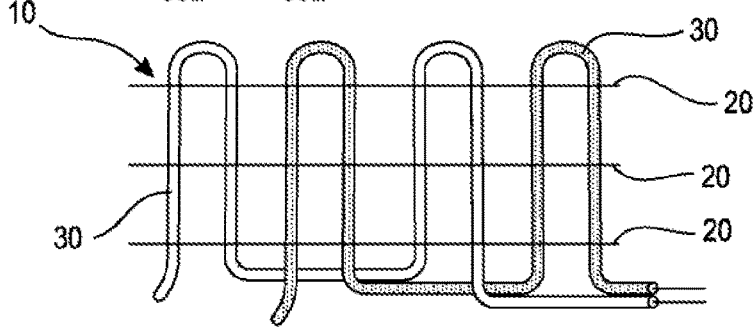
Figure 2C:
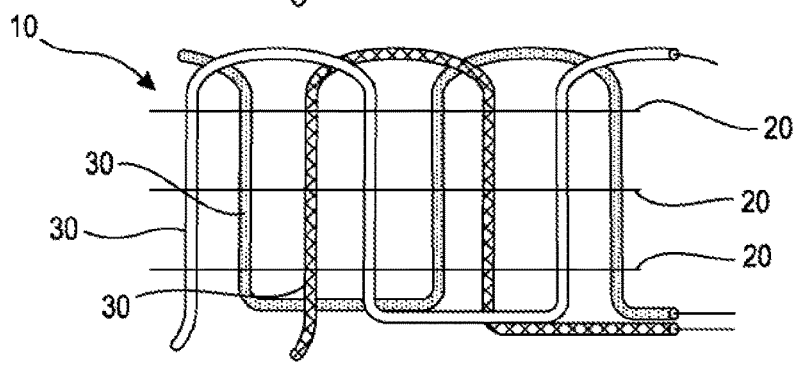
Figure 2D:
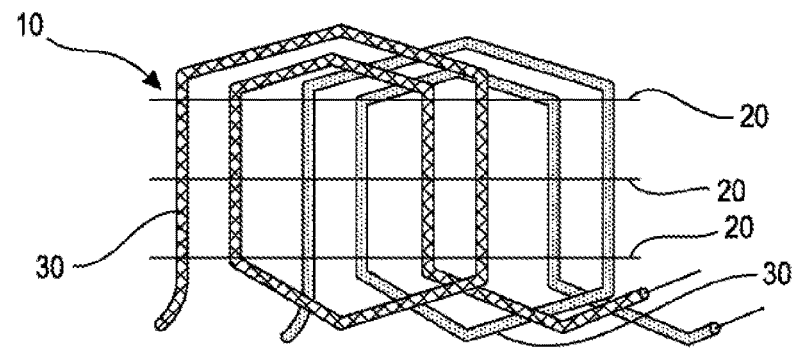
Figure 2E:
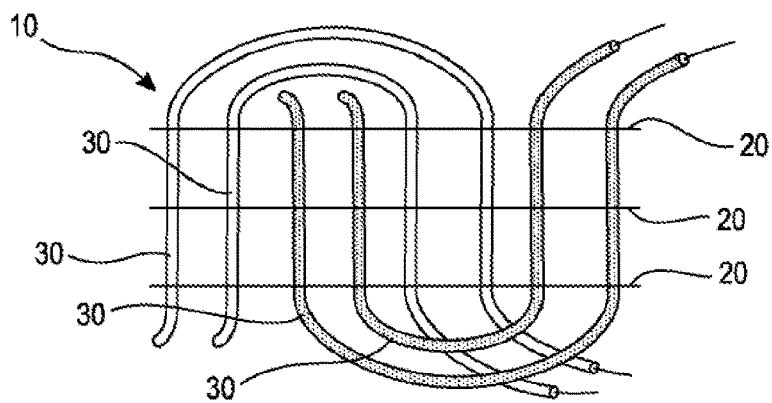
Figure 3A:
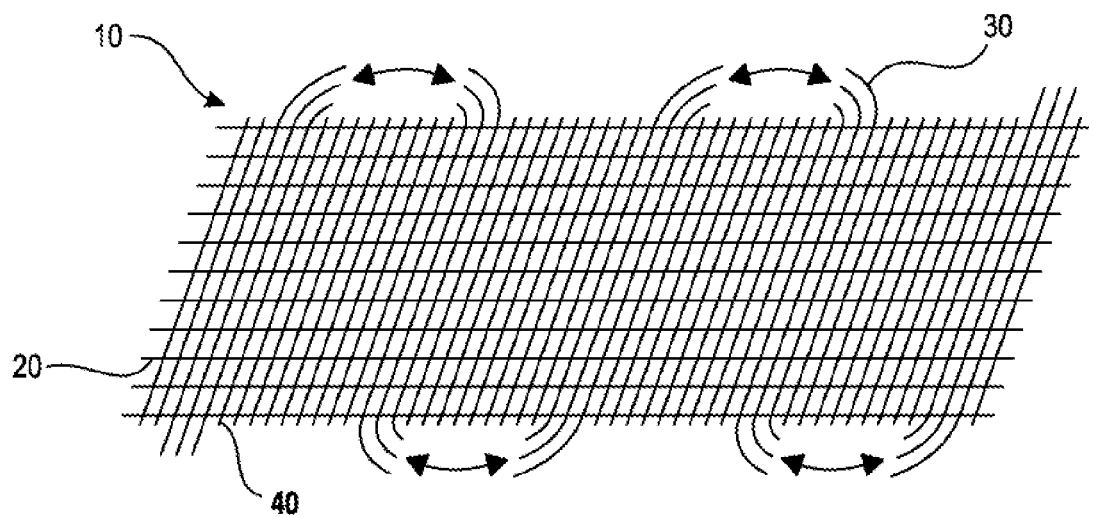
FIGS. 3A-3C show further embodiments of electromagnetic mats.
Figure 3A:
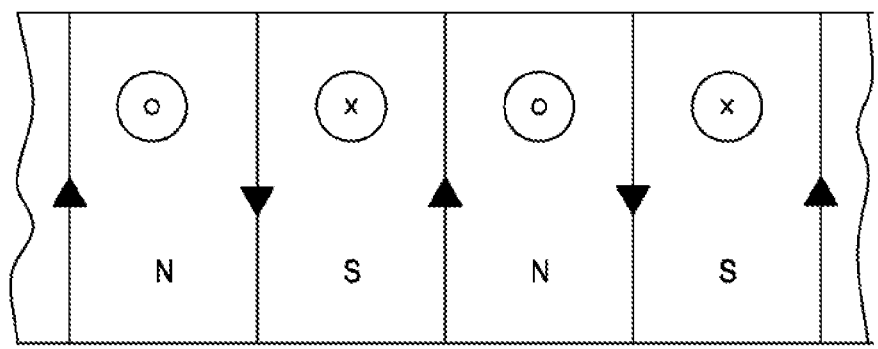

Reference is now made to FIGS. 2A-2E which show electromagnetic mat 10 for a stator or rotor component the electromagnetic mat 10 is formed by structural fibre lengths 20 (i.e. fibre warps 20 with non-conductive surface) and winding fibre lengths 30 (i.e. electrical conductor fibre wefts 30) that may be used to form windings. FIG. 2A) shows eight un-connected discrete (e.g. cut) winding fibre lengths 30 (e.g. electrical conductor fibre wefts 30) inserted into the grid (i.e. support structure) formed by the structural fibres 20 (e.g. fibre warps 20 with non-conductive surface). The support structure (i.e. grid) is provided by having a plurality (in this illustration, three) parallel structural fibres. FIGS. 2B-2E show different ways/combinations of connecting the discrete winding fibre lengths 30 so to create different winding patterns (i.e. different EM-fields). In particular 2b) shows a 2-phase, concentrated winding, 2c) shows a 3-phase, wave winding, 2d) shows 2-phase, distributed winding, and 2e) shows 2-phase, wave winding, with two winding fibres 30 per phase.

The EM-design is e.g. given by the inner and outer diameter of the stator or rotor component for rotary machines, and length and thickness for linear machines. This information can be used for calculating the total length of the electromagnetic mat 10, and the number of layers in total.

In the case of a cylindrical rotor or stator component which is formed by rolling the electromagnetic mat 10 into a cylinder with one or multiple layers, each layer will have a larger circumference than the previous layer. It is desirable for the windings of each layer to align so as to form the slots of the rotor or stator component. As the circumference increases, each new layer will be slightly longer than the layer within. For each new "layer length" of the electromagnetic mat 10 the winding fibre lengths 30 (i.e. electrical conductor fibre wefts 30) may thus be separated more so that they fall onto their correct position. Thus the winding pattern may be arranged so that independent of diameter, the angle of slots may be constant.

Figure 3B:
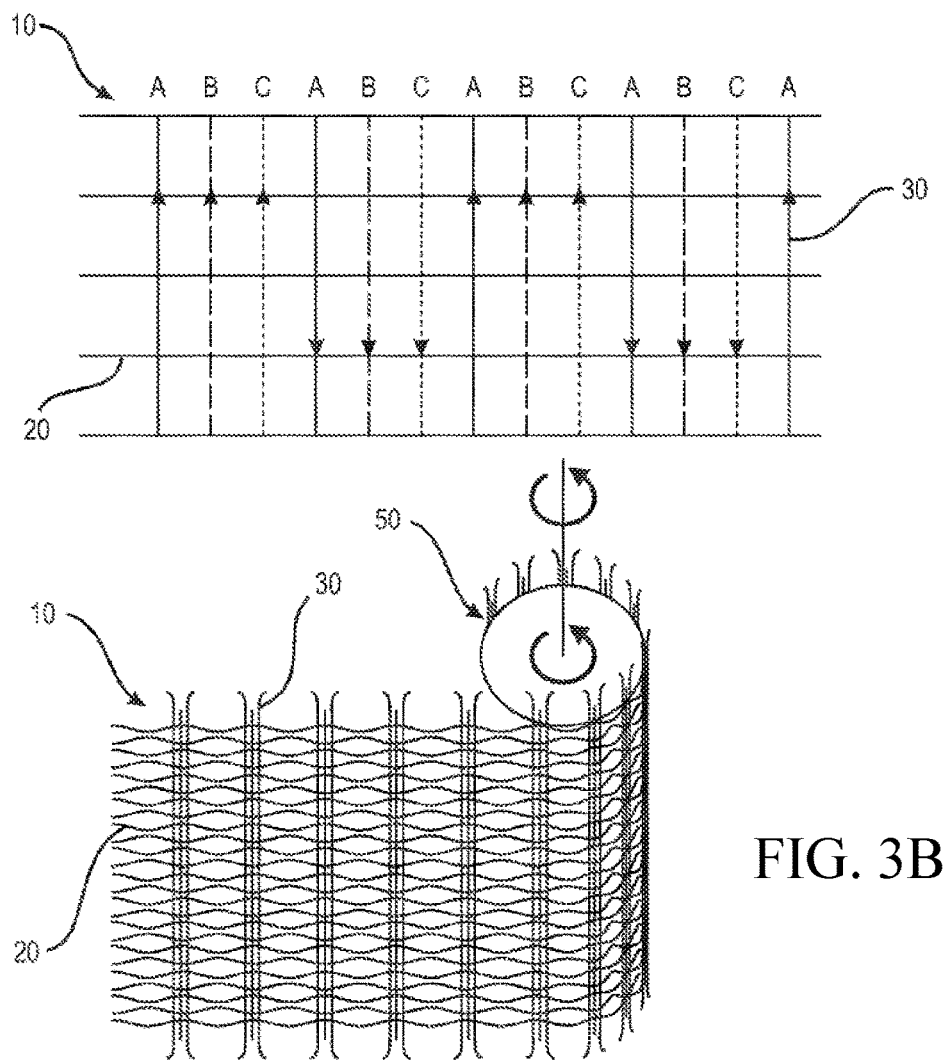
Figure 3C:
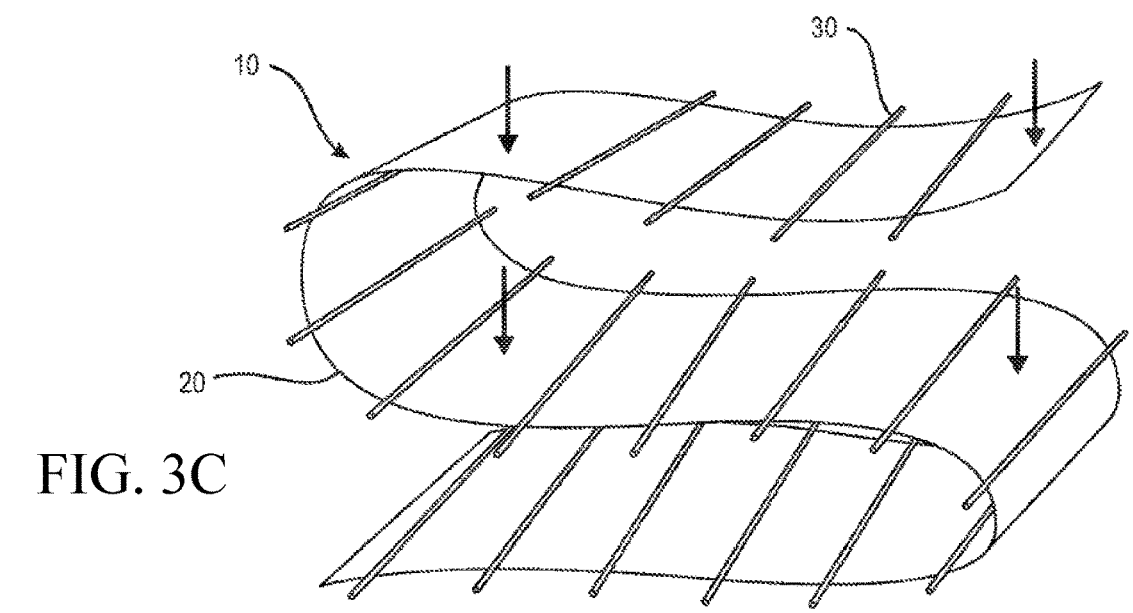

FIGS. 3A-3C illustrate parts of forming of a stator or rotor component. The disclosed electromagnetic mat 10 may be pulled linearly and cut, or rolled up on an object (e.g. base), typically mainly cylindrical, for rotary electrical machines. For linear electrical machines the electromagnetic mat 10 may be folded.

FIG. 3A shows a grid of structural fibre lengths 20 (i.e. fibre warps 20 with non-conductive surface) and winding fibre lengths 30 (e.g. electrical conductor fibre wefts 30). In between the winding fibre lengths 30, seen in longitudinal direction of the electromagnetic mat 10, are arranged property modifying fibres 40. These property modifying fibres may for example be non-conductive fibre wefts 40. The property modifying fibres 40 can be arranged to provide insulation or other mechanical or thermal properties. As will be described below there can also be arranged property modifying fibres with electromagnetic properties in the first direction of the electromagnetic mat, e.g. in the form of fibre wefts with electromagnetic properties. In the shown embodiment the windings are formed by discrete (e.g. cut) electrical conductor fibre wefts 30 that may be connected (as illustrated by the arrows) outside of the grid formed by the structural fibres 20, e.g. with non-conductive surface, property modifying fibres 40 and winding fibre lengths 30. Underneath the illustration of the electromagnetic mat 10 is shown the resulting EM-field—alternating north and south poles—when current is applied in the direction of the arrows.

FIG. 3B shows a first a 2D-pattern of winding fibre lengths, i.e. conductors 30. Initially, all winding fibre lengths 30 are the same. Letters A, B, C indicates which cut electrical conductor fibre wefts 30 that are to be connected together to form Phase A, Phase B and Phase C. Underneath the 2D-pattern of winding fibre lengths is shown how the electromagnetic mat 10 can be rolled up on a cylindrical object (e.g. base) 50.

FIG. 3C illustrates folding of the electromagnetic mat 10, which may be the basis of linear electric machine components, e.g. linear motor components.

Figure 4A:
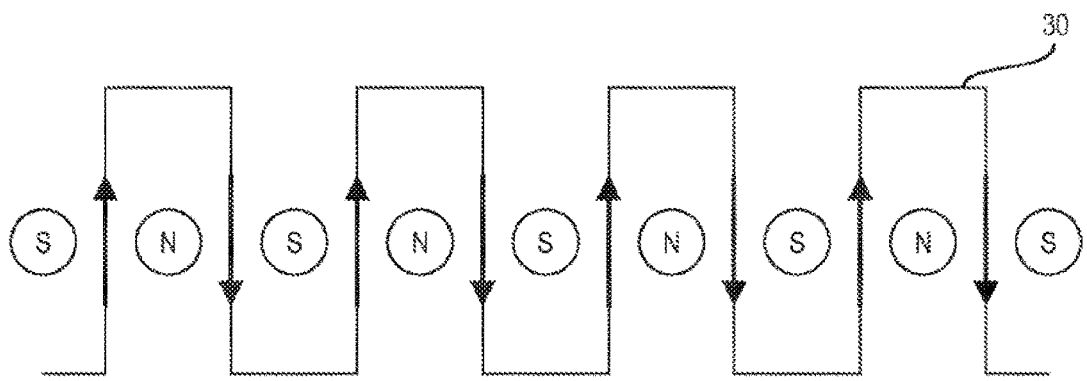
FIGS. 4A and 4B show EM-design patterns.
Figure 4B:
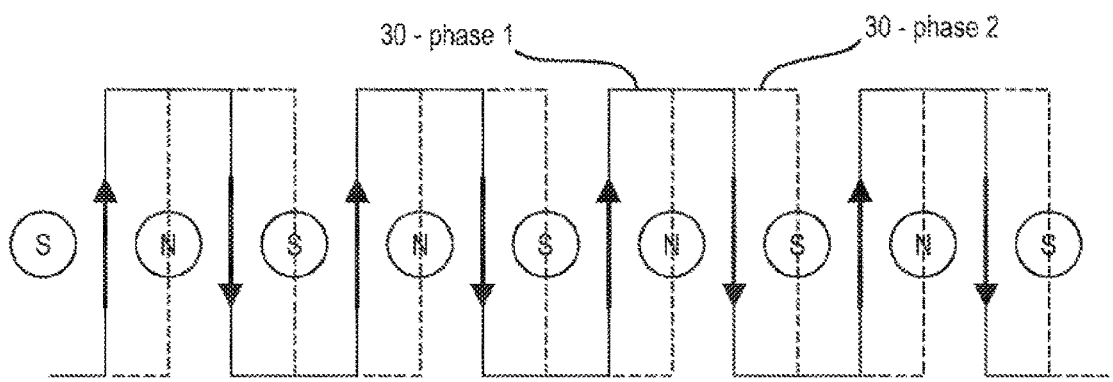

FIGS. 4A and 4B illustrate exemplary winding patterns (i.e. EM-designs) for 1-phase motor and 2-phase motor, respectively, in the form of a 2D-representation. By applying a current, EM-fields will be induced.

In the production method the winding pattern may be tailored according to the desired rotor or stator component design. For example the winding pattern is in the form of a barcode pattern that can be changed easily. This may be achieved for example by using discrete, e.g. cut, winding fibre lengths 30 (e.g. electrical conductor fibre wefts 30), the desired winding pattern (number of wires per slots, number of phases, etc.) can be arranged by connecting (e.g. selecting how to connect) the ending windings of the discrete winding fibre lengths 30 after they are arranged in the electromagnetic mat 10. Accordingly, this may allow for the production of a similar electromagnetic mat 10 for different electrical machines as the winding can be arranged at the end.

In the case of an electromagnetic mat 10 with winding fibre lengths 30 formed from continuous winding fibres (e.g. continuous electrical conductor wefts 30) the winding pattern (electromagnetic design (number of wires per slots, number of phases, etc.)) may have to be decided during the interweaving of the fibres to form the mat, i.e. during the winding process. The winding pattern (electromagnetic design) can be modified by modifying how the continuous winding fibres 30 are inserted, i.e. inserted into a supporting grid formed by the structural fibre lengths.

Thus, regardless if continuous winding fibres 30 or discrete (e.g. cut) winding lengths 30 are used to provide the winding lengths, all designs, i.e. winding patterns and/or EM designs, can be created.

As it can be seen in FIGS. 3A and 3B and FIGS. 2A-2E, all discrete (e.g. cut) winding fibre lengths 30 may extend mainly in a transversal direction in the active area, and makes up a winding pattern. This pattern may be different for different types of electric machines, but as regards the production process all the discrete fibre winding lengths 30 (e.g. cut electrical conductor fibre wefts 30) may be the same until connected to other discrete fibre winding lengths 30 (e.g. cut electrical conductor fibre wefts 30). Thus, changing the winding pattern (EM-design) (the machine specifications) may only affect how the discrete fibre winding lengths 30 are connected.

The diameter of the stator or rotor component may easily be changed by changing the geometry of object 50 (e.g. mainly cylindrical base) the electromagnetic mat 10 is rolled up on.

Figure 5:
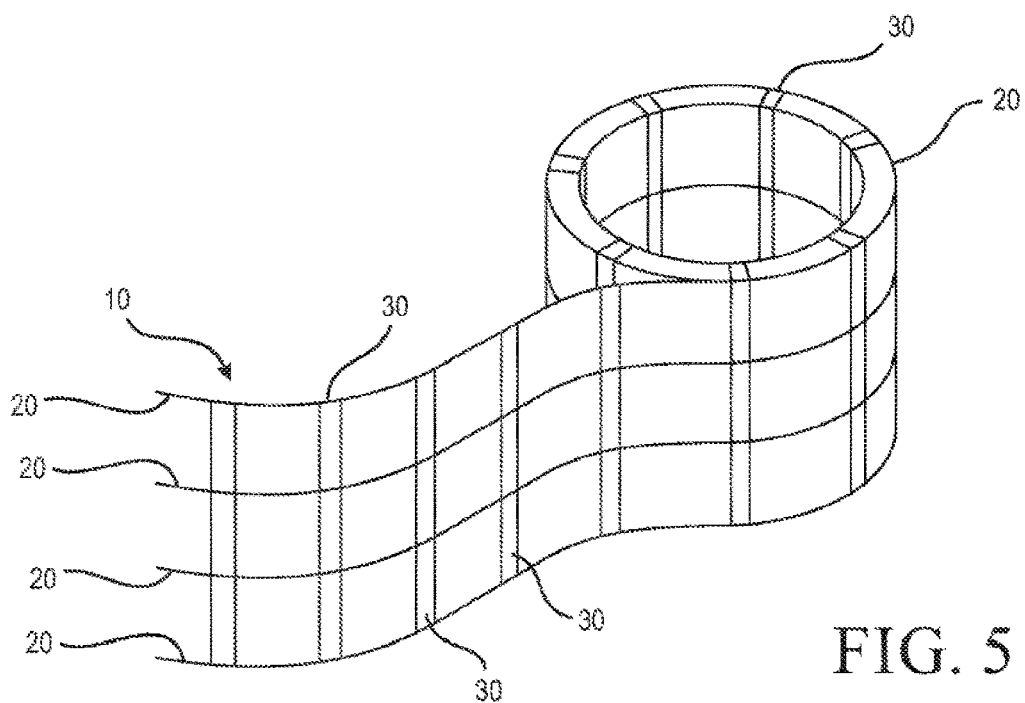
FIG. 5 shows a rolled-up electromagnetic mat.

FIG. 5 shows a rolled-up electromagnetic mat 10. The thickness of a stator or rotor component may easily be changed by rolling/folding more of the electromagnetic mat 10 on top of the other layers. Accordingly, the longer the electromagnetic mat 10, the thicker the component may be.

Further, by adding or removing structural fibre lengths 20 (e.g. fibre warps 20 with non-conductive surface (and/or non-conductive property modifying fibre wefts 40 and/or electrical conductor fibre wefts 30)) the mechanical strength of the stator or rotor component can be altered/tailored. The mechanical strength can also be affected/altered/tailored by the tension in the fibres, i.e. fibre warps and/or wefts, and/or impregnation/molding material chosen. Further, by adding or removing other fibres also other properties can be altered, such as thermal properties.

A production method for a rotor or stator component will include a step (e.g. initial step) of forming (e.g. weaving, twining or winding) electromagnetic mat 10. The method may also comprise a step (e.g. final step) of molding. The production method may further comprise one or more steps (e.g. intermediate steps) for forming through roll-up, folding or other, and/or impregnation. In the case that the mat is formed from discrete winding fibre lengths 30 (e.g. cut electrical conductor fibre wefts 30), the method may also comprise a step (e.g. intermediate step) of connecting the ends thereof (which may be referred to as connection of end windings). The sequence of steps may be altered, such that the steps may be performed in any order, depending on the application or desires, for example the method steps may be performed in the following orders:

connection of ends (only when using discrete winding fibre lengths), roll-up or folding and impregnation, connection of ends (only when using discrete winding fibre lengths), impregnation and roll-up or folding, roll-up or folding, connection of ends (only when using discrete winding fibre lengths) and impregnation, roll-up or folding, impregnation and connection of ends (only when using discrete winding fibre lengths), impregnation, roll-up or folding and connection of ends (only when using discrete winding fibre lengths), impregnation, connection of ends (only when using discrete winding fibre lengths) and roll-up or folding.

Figure 6A:
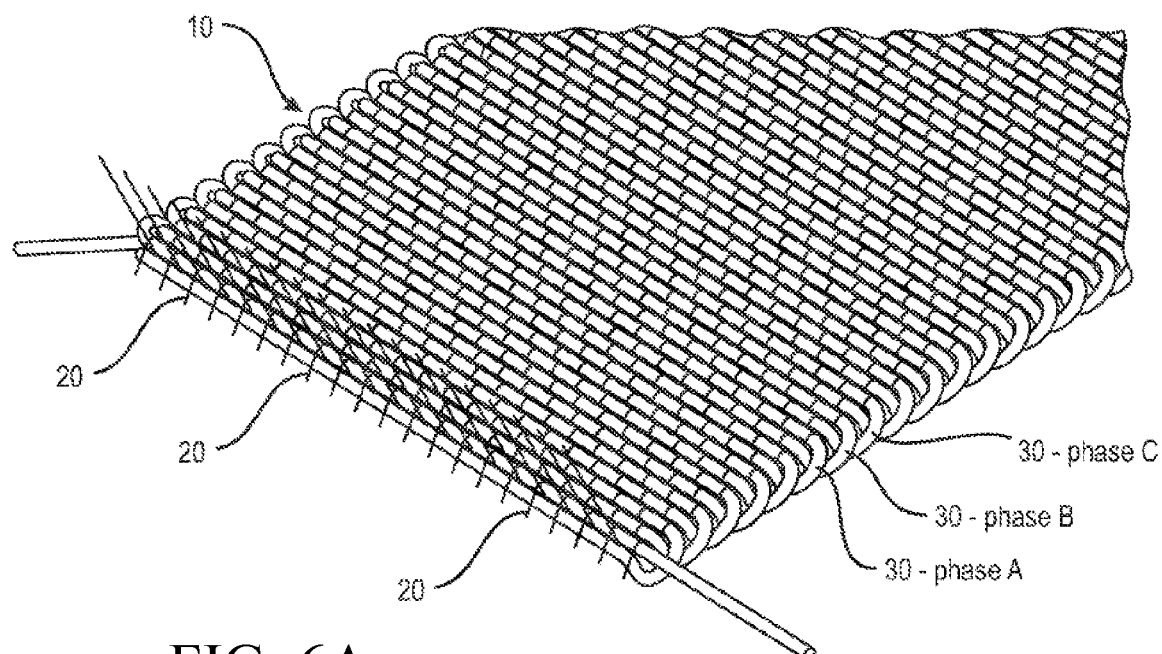
FIGS. 6A-6C show stages of a production method.
Figure 6B:
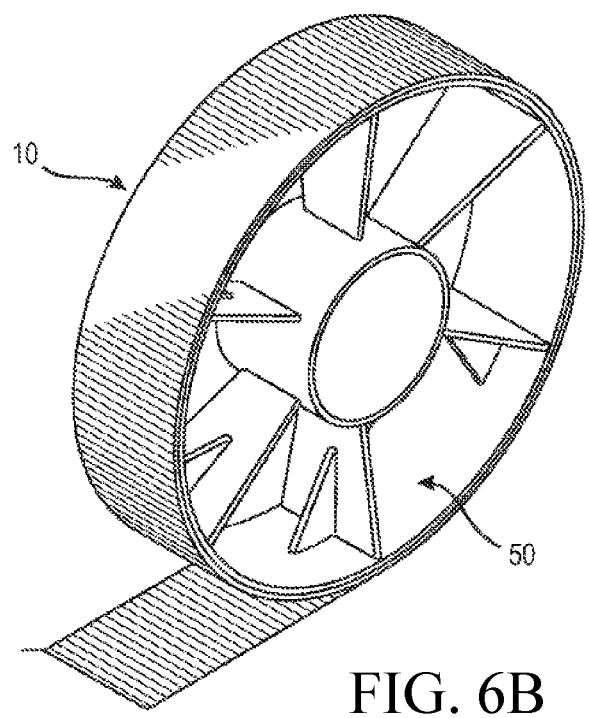
Figure 6C:
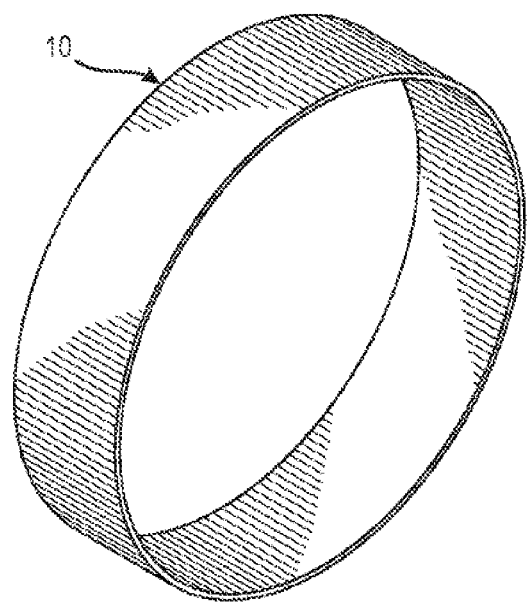

Reference is now made to FIGS. 6A-6C. In FIG. 6A is shown an electromagnetic mat with three phases A, B and C. It should be mentioned that even though only one winding fibre 30 (i.e. electrical conductor fibre weft 30) is shown per phase, several electrical conductor fibre wefts 30 may be used for each phase/winding.

FIG. 6A illustrates a step of weaving continuous winding fibres 30 (i.e. electrical conductor fibre wefts 30) into an electromagnetic mat 10 formed by structural fibre lengths 20 (e.g. fiber warps with non-conductive surface). The pattern of fibres may be customised, based on the electric machine, e.g. motor, design.

FIG. 6B illustrates a step of rolling the electromagnetic mat 10 formed by structural fibres 20 and winding fibre lengths 30 up on a cylindrical object 50 (e.g. a base 50).

FIG. 6C shows a stator or rotor component, i.e. electromagnetic mat 10 after the step of molding, where the object 50, i.e. base 50, is removed, and the stator or rotor component is ready for integration in an electrical machine and connection of the windings to a power supply source and/or control system.

The cylindrical object 50 (e.g. base 50) may not be removed, and may be a part of the final stator or rotor component. The properties of the object 50, e.g. base 50, may be of mechanical, electromagnetic, thermal, conductive or other nature.

The step of impregnation may be performed with a solidifiable material such as a curable liquid potting material, such as epoxy, resin or similar. The solidifiable material may be applied before or after the forming, e.g. roll-up or folding, of the mat into the stator or rotor component. The fibres 20, 30, e.g. warps 20 and/or wefts 30, 40, 70, may be pre-impregnated.

FIGS. 7A-7D further illustrate connection of discrete winding fibre lengths 30, e.g. electrical cut conductor fibre wefts 30, of the electromagnetic mat 10.

The figures show the electromagnetic mat 10 formed with discrete winding fibre lengths 30, e.g. cut electrical conductor fibre wefts 30, through the winding process. After the electromagnetic mat 10 is created, each discrete winding fibre lengths 30 is to be connected to its respective partner(s), i.e. corresponding discrete winding fibre lengths to form the windings.

Figure 7A:
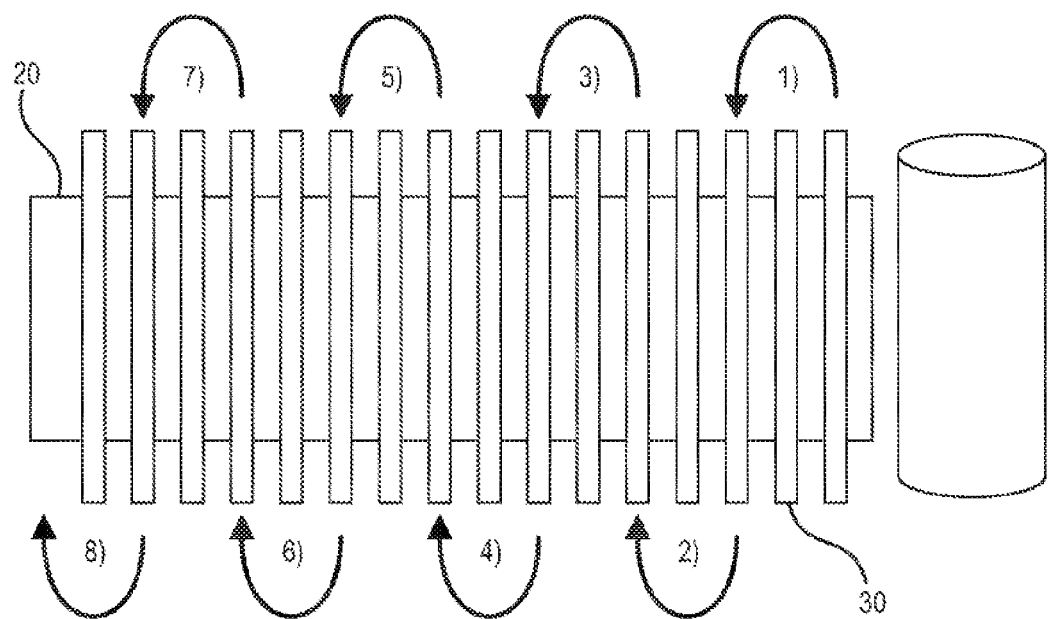
FIGS. 7A-7D show electromagnetic mats and connection of cut electrical conductor fibre wefts.
Figure 7B:
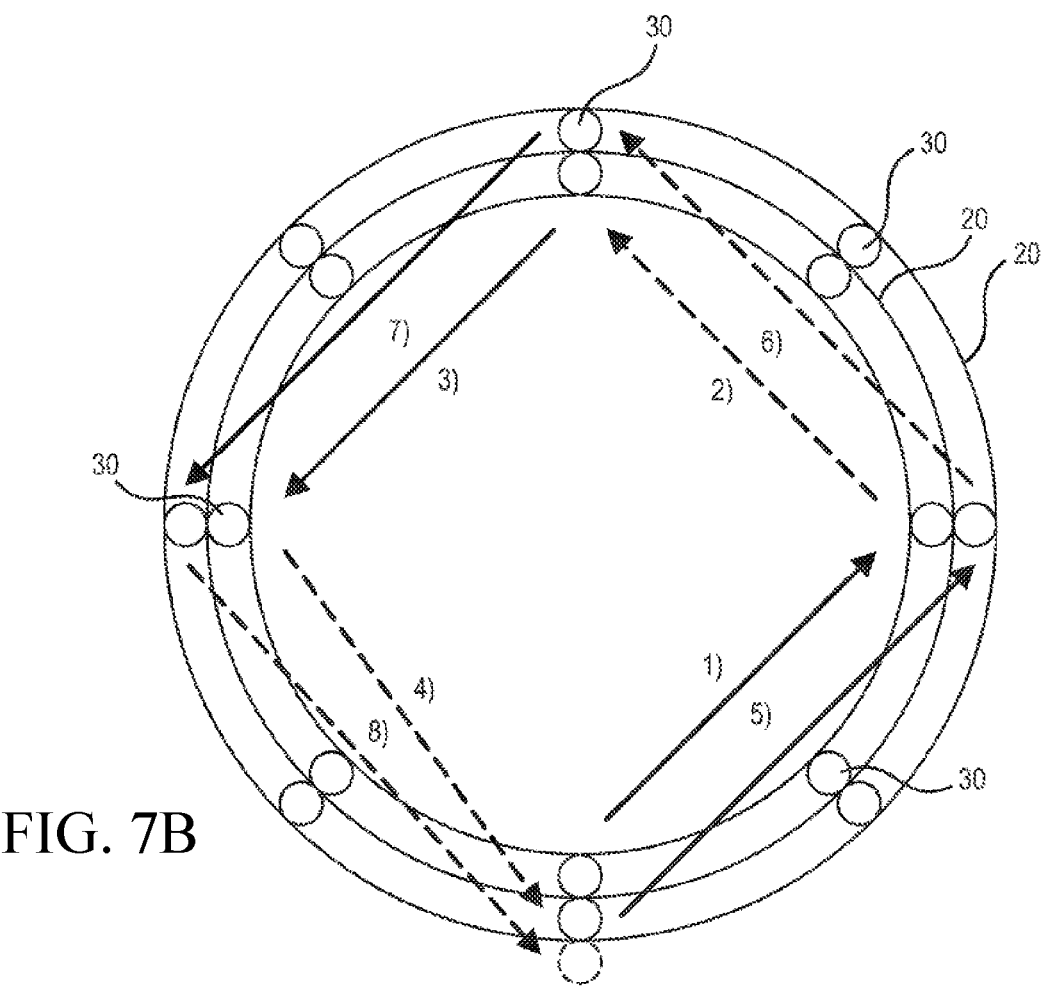

FIG. 7A shows an electromagnetic mat 10 with discrete winding fibre lengths 30, e.g. cut electrical conductor fibre wefts 30. The length of the electromagnetic mat in this example corresponds to two layers. Each discrete winding fibre length 30 is to be connected to the neighboring discrete winding fibre length 30 of same phase. In the shown example the winding pattern is wave winding. FIG. 7B shows the electromagnetic mat 10 in FIG. 7A rolled up on a cylindrical object 50 seen from above. Arrows show how the cut electrical conductor fibre wefts 30 are connected, where thick arrow is used to illustrate the front side, and a dotted arrow is used to illustrate the back side.

The discrete winding fibre lengths 30 may be connected before or after the rotor or stator component is formed.

Figure 7C:
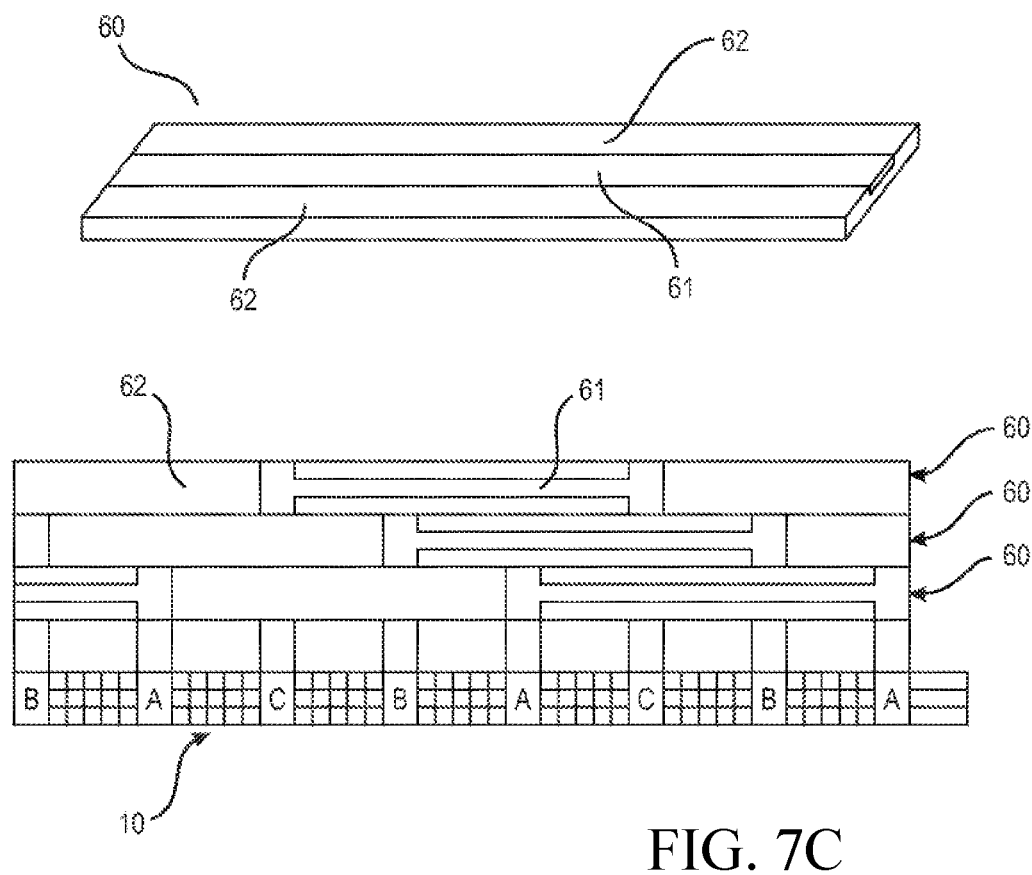
Figure 7D:
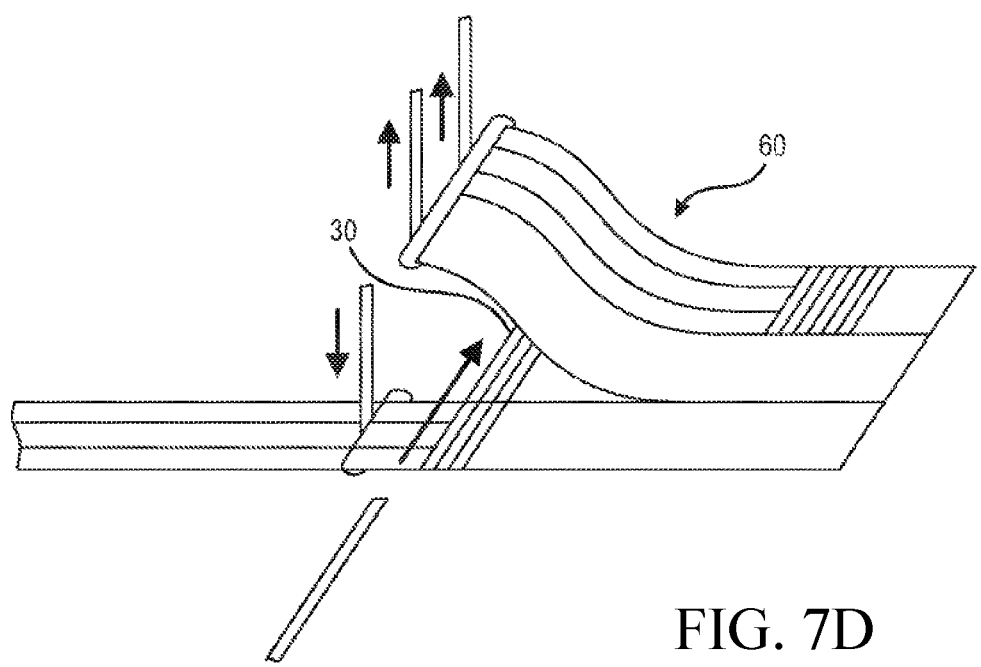

FIGS. 7C and 7D illustrate how discrete winding fibre lengths 30, e.g. cut electrical conductor fibre wefts 30, may be connected. Using discrete winding fibre lengths 30 may simplify the production method. In that case, connections between respective discrete winding fibre lengths 30 will have to be performed.

FIG. 7C shows a connection strip 60, formed by a conductive material 61 enclosed by insulating (non-conductive) material 62 at three of the sides thereof which can be used for connection of discrete winding fibre lengths 30. Underneath this is shown how the end windings/discrete winding fibre lengths 30 of the electromagnetic mat 10 may be connected to different connection strips 60, where each phase A, B, and C, is connected to separate connection strips 60.

FIG. 7D illustrates how each connection strip 60 may be inserted during the production process, where discrete winding fibre lengths 30 are inserted in the same way as in the electromagnetic mat 10.

Figure 8:
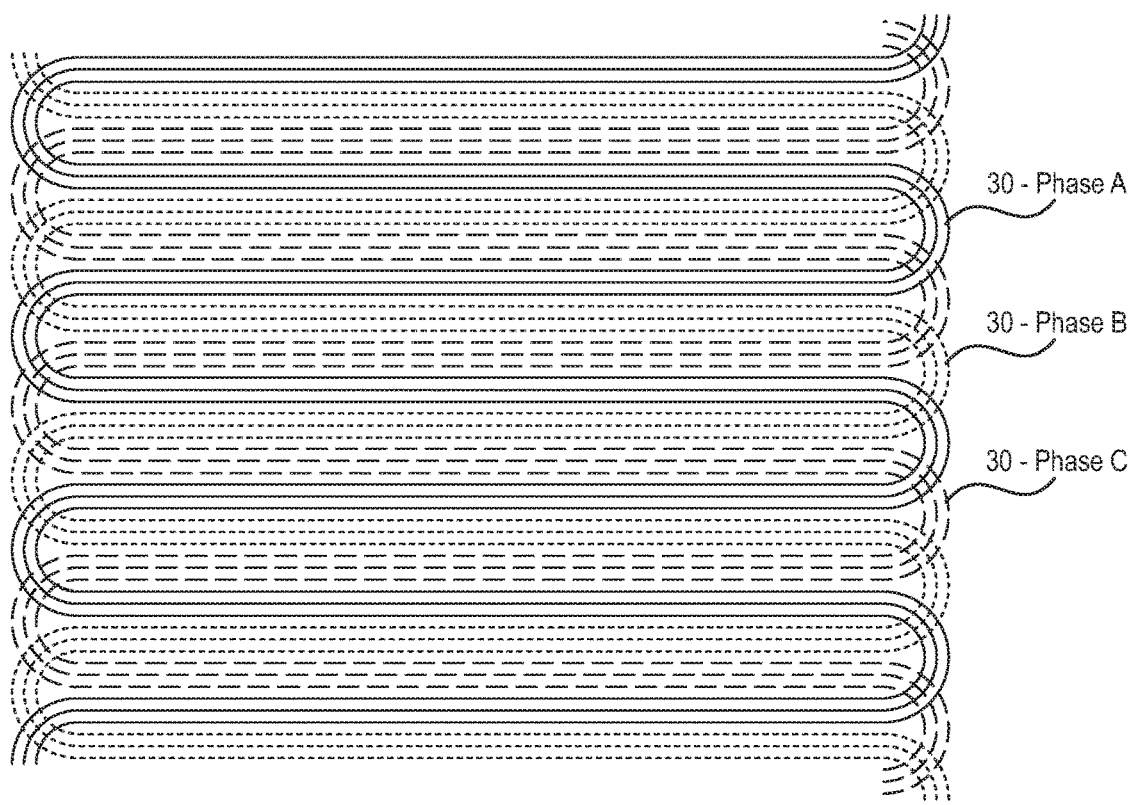
FIG. 8 shows windings formed by continuous winding fibers.

Reference is now made to FIG. 8 illustrating continuous winding fibres (e.g. electrical conductor wefts) 30. Accordingly, an alternative embodiment to the discrete winding fibre lengths is continuous electrical conductor fibre wefts 30, where instead of having separate winding fibre lengths, e.g. instead of cutting the electrical conductor wefts 30 for each time it is passed over the grid of the structural fibres 20, i.e. warps 20 with non-conductive surface, and possibly warps with other properties, in the electromagnetic mat 10, the electrical conductor fibre wefts 30 are continuous. FIG. 8 shows an example of 3-phases, with three continuous electrical conductor fibre wefts 30 per phase, where only the continuous winding fibres, e.g. electrical conductor fibre wefts, 30 are shown. The continuous winding fibres 30 can be arranged as last in—first out-principle or first in—first out-principle.

Here one can for example utilise multi-shuttle weaving, where each shuttle may be in control of one or more continuous electrical conductor fibre wefts 30.

Accordingly, there may be provided a multidimensional grid with multiple properties.

Figure 9:
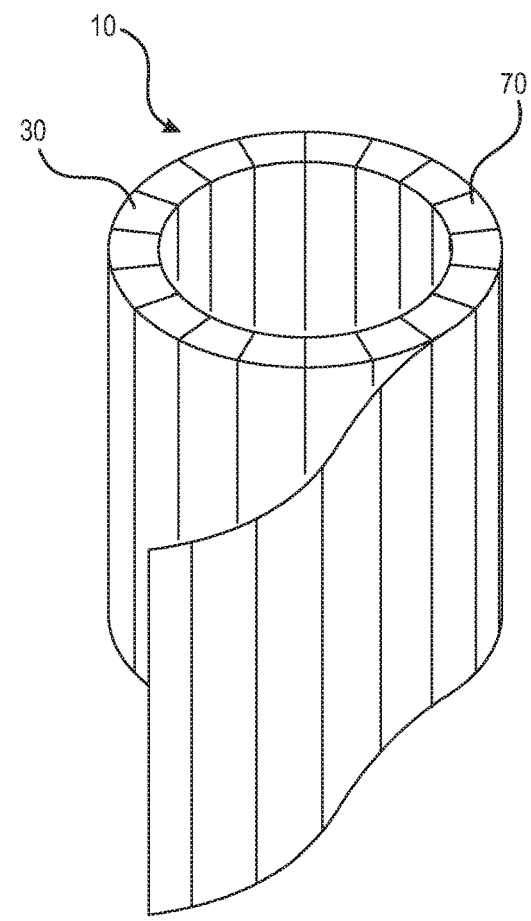
FIG. 9 shows a rolled up mat with additional property modifying fibres.

FIG. 9 shows a further embodiment, where there are arranged property modifying fibres 70 (additional fibre wefts) with mechanical, electromagnetic and/or thermal properties, e.g. ferromagnetic, arranged between the winding fibres, e.g. electrical conductor fibre wefts 30. This may create a slotted (iron-cored) stator or rotor component. The density and variations of the fibre wefts 70 may be modified so they create unique electromechanical or mechanical (or other) properties. In the shown example the pattern alternates between electrical conductor fibre wefts 30 and fibre wefts 70 with mechanical, electromagnetic and/or thermal properties. When the electromagnetic mat 10 is rolled up, the fibre wefts 70 with mechanical, electromagnetic and/or thermal properties, e.g. formed by iron fibres, may form iron slots. This may mimic the properties of iron-cored electrical machines with iron teeth. For this setup, back-iron may not be needed. The density of fibre wefts 70 with mechanical, electromagnetic and/or thermal properties may be chosen so to create a lightweight stator or rotor component with good mechanical, electromagnetic and/or thermal properties.

The electromagnetic mat 10 may also comprise, in addition to structural fibres (e.g. warps 20 with non-conductive surface), warps exhibiting mechanical, electromagnetic and/or thermal properties (i.e. property modifying fibres). These may be arranged to guide the magnetic flux, or work as a heat sink for example. For a combination of fibre warps and fibre wefts with mechanical, electromagnetic and/or thermal properties, e.g. back iron could be created by applying layers of these mechanical, electromagnetic and/or thermal properties on top of, under, or between layers.

In yet a further embodiment, Z-fibres may be introduced, i.e. fibres extending in a direction that is a direction that is not in the plane formed by the first and second directions, e.g. thickness, vertical, and/or radial direction of the electromagnetic mat. By introducing Z-fibres, both electromagnetic and mechanical properties may be altered. Z-fibres may be added for support by e.g. stitching the layers of the electromagnetic mat 10 together. Z-fibres may also have e.g. flux carrying properties. In this way, iron slots may be created as described above, but with the fibre in the radial direction.

In an alternative embodiment, instead of using Z-fibres directly in the production, electromagnetic mats 10 may be arranged/folded on top of each other and stitched together with fibres in the Z-direction.

Figure 10:
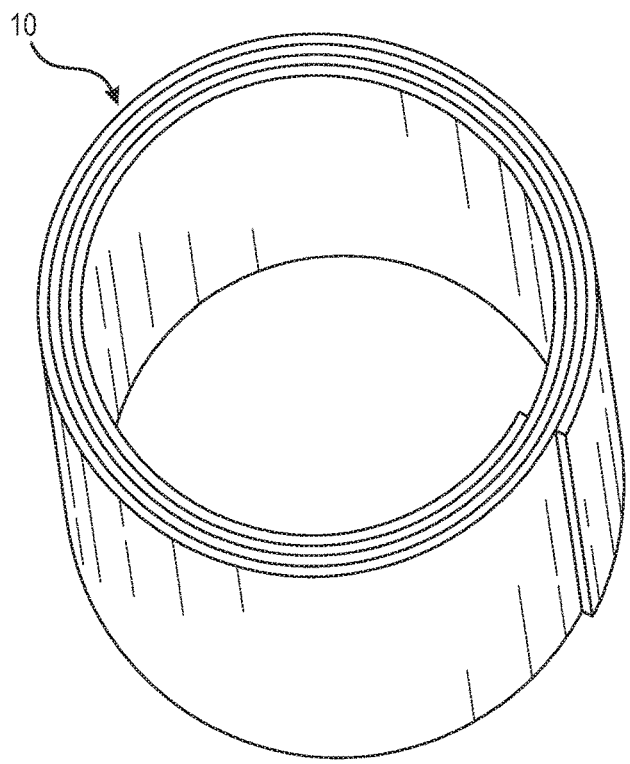
FIGS. 10 and 11 show an electromagnetic mat with multiple layers.

FIG. 10 shows an embodiment of the electromagnetic mat 10 with multiple layers. One of the major benefits of the production method may be the flexible way of adding material in the thickness direction of the formed component. This may be achieved by simply by rolling up and/or adding more layers of the electromagnetic mat 10.

Figure 11:
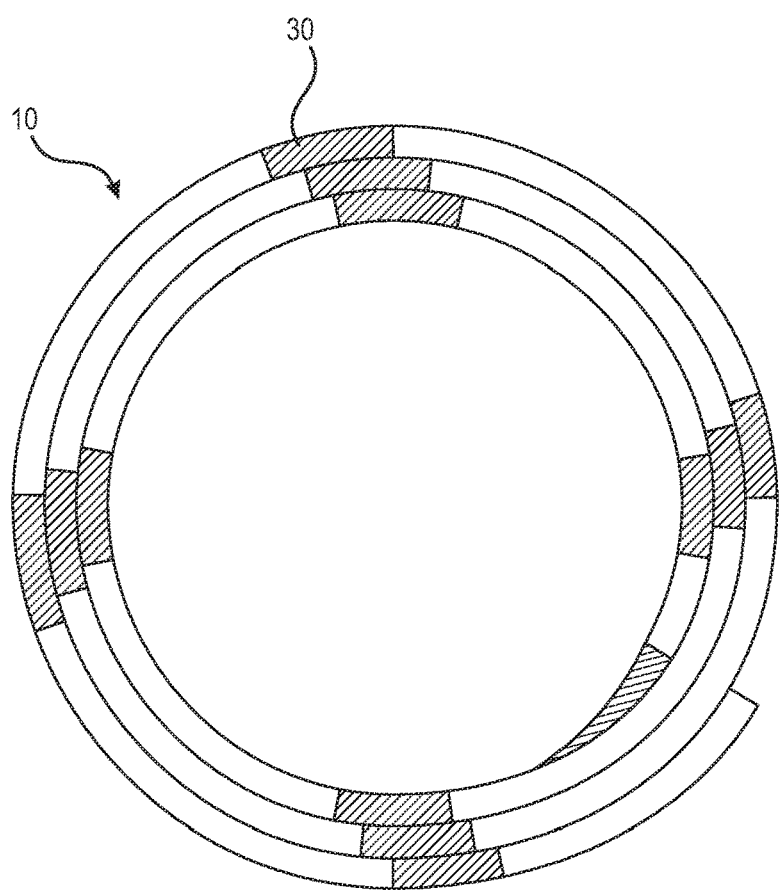
Figure 12A:
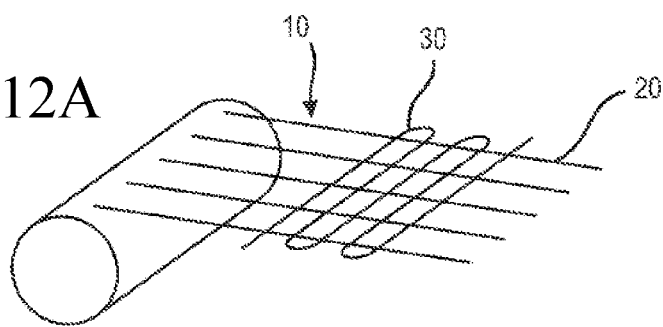
FIG. 12 shows further electromagnetic mats.
Figure 12A:
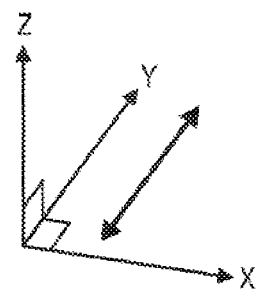
Figure 12B:
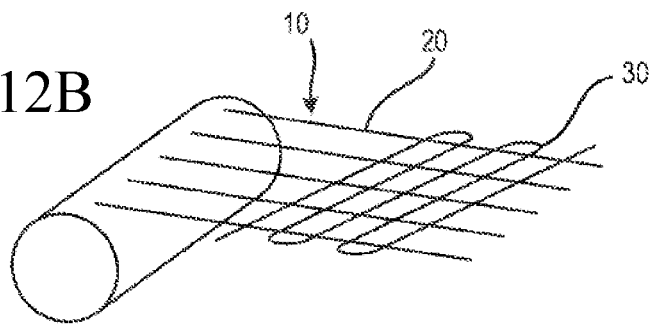
Figure 12B:
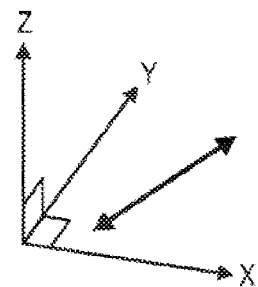
Figure 12C:
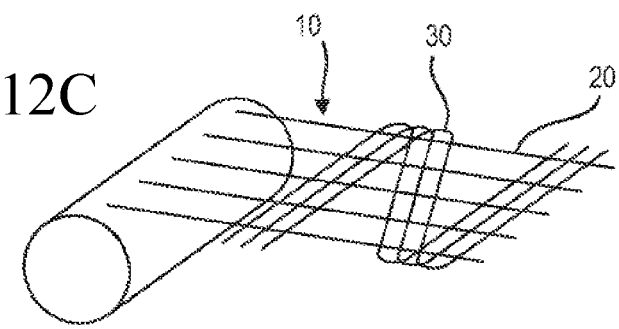
Figure 12C:
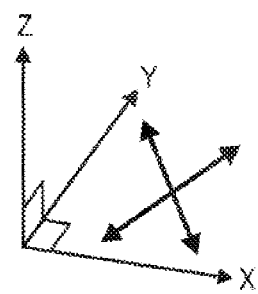
Figure 12D:
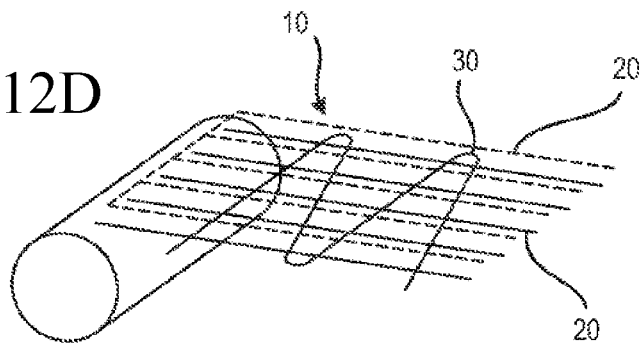
Figure 12D:
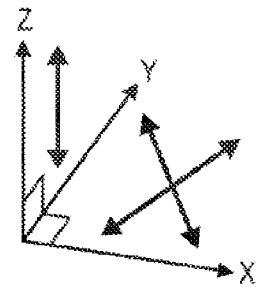

In the case of a rolled up mat, as the circumference increases with each new layer of the electromagnetic mat 10, the length of each layer also increases. That means that the pattern also should be more spread out, or distributed, i.e. the spacing between fibres widened. If each layer of the electromagnetic mat 10 is designed to be the same length then the slots for each new layer of the electromagnetic mat 10 will be placed slightly "off-set". For several layers, the effect would be as shown in FIG. 11.

Winding fibre lengths 30, e.g. electrical conductor fibre wefts 30 are inserted and arranged in a pattern which can be used to form a stator or rotor component, e.g. for electromagnetic purposes. The direction of the winding fibre lengths 30, e.g. electrical conductor fibre wefts 30, relative to each other, can be in several dimensions, thus providing a 2-dimensional or 3-dimensional winding for example.

Reference is here made to FIGS. 12A-12D which show examples of different winding patterns which may be achieved.

In FIGS. 12A-12D, the X-direction is in the direction of the structural fibres 20, e.g. fibre warps 20, while the Y-direction is the direction perpendicular to the X-direction and the direction (at least broadly) of the winding fibre lengths, e.g. fibre wefts 30, in the same plane. The Z-direction is in a direction perpendicular to both X and Y. The X direction may be parallel to the length of the electromagnetic mat, the Y direction may be parallel to the width of the electromagnetic mat and the Z direction may be parallel to the thickness direction of the electromagnetic mat.

In each example shown in 12a) to d) the structural fibres 20 extend in the X-direction. In example a) the winding fibre lengths 30 extend in parallel and only in the "normal" Y-direction inside the "active area" (where the active area may be regarded as the area within the outermost structural fibres 20). In example b) the winding fibre lengths 30 extend in parallel, in the YX-direction, i.e. a direction that is non-parallel to the X or Y directions but in the plane formed by the X and Y directions. The winding fibre lengths 30 form a constant angle with the structural fibres 20 inside the "active area". In example c) the winding fibre lengths 30 extend in parallel in both the YX and XY direction. The winding fibre lengths 30 form a constant angle with the structural fibres 20, but change direction for each "turn". This pattern may be described as a tilted or zig-zag winding pattern. In example d) the structural fibres 20 are formed in two (or more) layers, creating a 3D-grid. The winding fibre lengths 30 extend in YX-, XY- and Z-direction, thus in all directions simultaneously. The winding fibre lengths 30 do not need to be aligned, meaning some winding fibre lengths 30 could extend in ZY-direction, some in XY-direction and some in XYZ-direction, simultaneously. Accordingly, forming a 3D winding.

If the winding fibre lengths 30 are arranged in other dimensional directions than Y-direction, the forming of the stator or rotor component might have to be performed differently. For example the electromagnetic mat 10 may be plied onto something, instead of rolled up or folded. In an alternative embodiment the 3D-winding may take place on, around, or through a previously made stator or rotor component, e.g. a cube or rectangle with holes.

Figure 13:
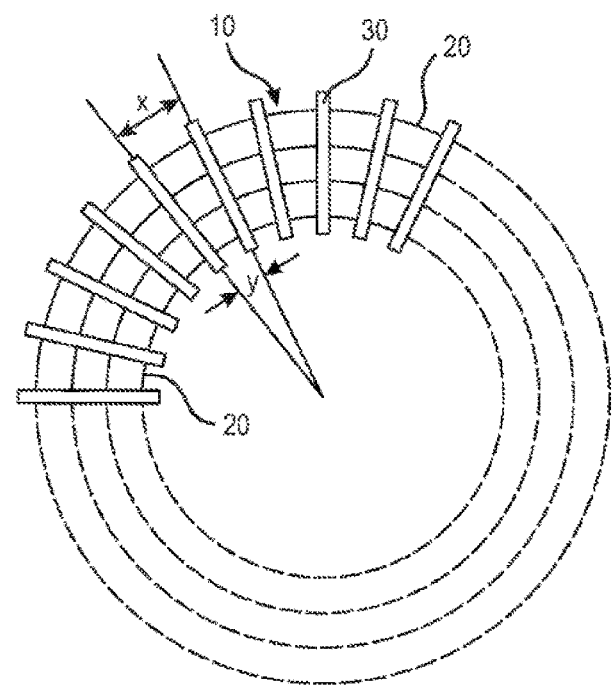
FIGS. 13, 14A and 14B illustrate weaving of shaped electromagnetic mats.

Reference is now made to FIG. 13 which shows an electromagnetic mat 10 with bent/curved shape. An electromagnetic mat 10 may be formed (e.g. woven, twined or wound) as for the prior embodiments, but it may have a bent/curved shape. This may be achieved by having structural fibres 20 (i.e. fibre warps 20) having different lengths. This may for example be achieved by allowing different pull-up speeds for different structural fibres 20 during production of the electromagnetic mat 10. The result may be a bent/curved electromagnetic mat 10, as shown in FIG. 13. FIG. 13 shows winding fibre lengths 30, e.g. electrical conductor fibre wefts 30, inserted into a bent/curved grid formed by structural fibres 20, i.e. warps 20 with non-conductive surface. In the shown electromagnetic mat 10 the bend/curve is constant, and is a circle/arc with a constant inner and outer diameter. The winding fibre lengths 30 may be arranged in the radial direction, and the grid is formed by structural fibre lengths 20 in a tangential/circumferential direction. Also this embodiment can comprise property modifying fibres, e.g. wefts 40, 70 as well as warps with mechanical, electromagnetic and/or thermal properties as described above.

By changing/altering/controlling the rate of bending (curvature) the resulting electromagnetic mat 10 may be shaped as for example a circle, an "S" or the number "8".

Figure 14A:
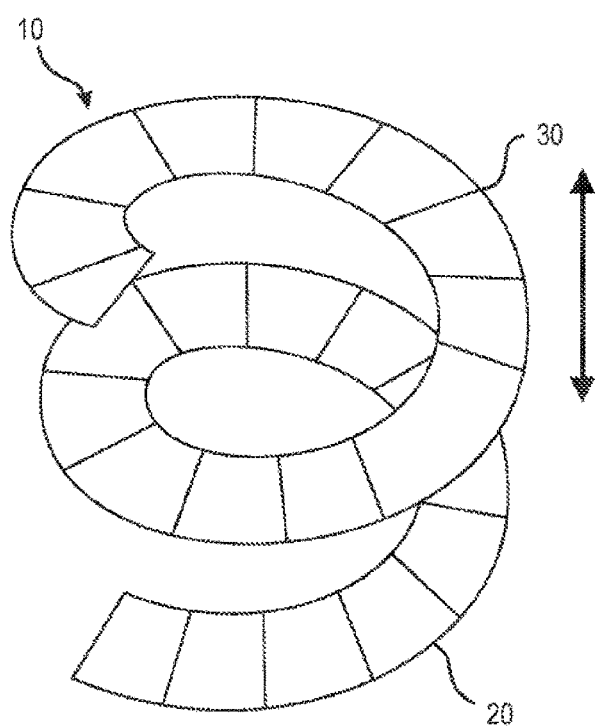
Figure 14B:
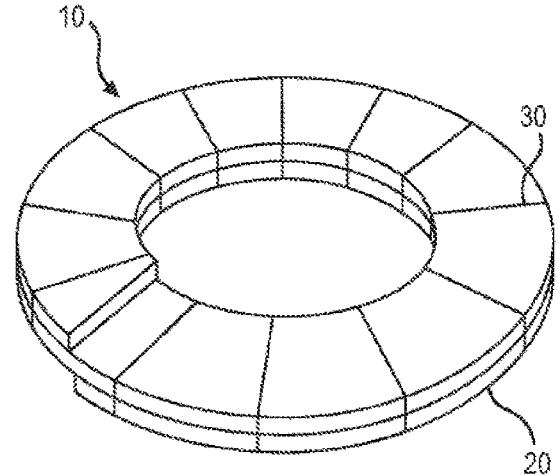

One application for an electromagnetic mat 10 with a bent/curved shape is electrical axial-flux machines. Electrical axial-flux machines have their magnetic flux in the axial direction. This may be achieved by providing a bent/curved electromagnetic mat 10 to create the form of a helix. By collapsing the helix a desired disc-shaped single- or multi-layered electromagnetic mat 10 may be created, as shown in FIGS. 14A and 14B, where FIG. 14A shows a helix-shaped electromagnetic mat 10, and FIG. 14B shows the collapsed helix-shaped electromagnetic mat 10 forming a disc-shaped multi-layered stator or rotor component.

This embodiment may benefit from the advantages of the other described embodiments, including the design of the pattern of the winding fibre lengths 30, e.g. electrical conductor fibre wefts 30, geometry, connection of the winding fibre lengths 30, and the use of discrete or continuous winding fibre lengths, e.g. cut or continuous electrical conductor fibre wefts 30.

Also this embodiment will have flexibility in that the distance between the outermost structural fibres 20, in combination with the "bending angle" (curvature), may be used to determine the inner and outer diameter of stator or rotor component. Further, the thickness of each layer, and the number of layers of the electromagnetic mat 10 may be used to decide/determine the thickness of the stator or rotor component.

Also this embodiment can make use of the above described property modifying fibres, e.g. warps or wefts with other properties, i.e. the use of fibre warps or fibre wefts with mechanical, electromagnetic and/or thermal properties. For example iron fibre wefts and/or fibre warps may be used to create iron teeth or back-iron, for increased magnetic flux.

Similar to the above embodiments also this embodiment can make use of the step of impregnation and molding to form the final stator or rotor component.

FIG. 15 shows the production of stator or rotor components for four machines at the same time, wherein dotted lines show where the mat may be cut after the electromagnetic mat 10 is formed. For a set of equal stator or rotor components, the pattern of fibre warps and wefts will be identical. If the width of the electromagnetic mat 10 (and hence grid) formed by the structural fibres, i.e. fibre warps 20 (and possibly fibre warps with mechanical, electromagnetic and/or thermal properties) is increased (e.g. by a factor of 4 (plus optionally any necessary buffer) (e.g. by spacing the outer most structural fibres on each side further apart from each other), and the lengths of each winding fibre length 30, i.e. electrical conductor fibre weft 30, and optionally property modifying fibres, e.g. non-conductive fibre wefts 40 and/or fibre wefts 70 with mechanical, electromagnetic and/or thermal properties, inserted into the grid, is increased (e.g. by a factor of 4), this may enable the mat to be used to form more products, for example it may enable the basis of four identical products. After the forming (e.g. winding) of the electromagnetic mat is performed, the stator or rotor component may in a simple manner be cut from the formed mat/sheet, e.g. by cutting in the longitudinal direction of the electromagnetic mat 10. This may be scaled up to as many products as wanted.

FIGS. 16A-16C show a method suitable for continuous winding fibres 30, e.g. electrical conductor fibre wefts 30. The pattern of the winding fibres 30 is provided by means of twining. In this embodiment at least two structural fibre lengths 20, e.g. warps 20 with non-conductive surface (and possibly fibre warps with mechanical, electromagnetic and/or thermal properties) form a grid (i.e. support structure) that is stretched out between a cylindrical object 50 (i.e. base 50) and a feeder assembly 80. A twining assembly 90 is positioned around the grid formed by the structural fibres 20, which is arranged to rotate around the grid. The twining assembly 90 is arranged to lay out continuous winding fibres 30 in a desired pattern around the grid. Similar to the embodiments above the mechanical, electromagnetic and/or thermal properties may be altered. For example all continuous winding fibres 30 from all phases A, B, C (e.g. 3) may be wound at the same time. This may for example be achieved if the winding fibres are arranged in a thin, flat, tape-format, as shown in FIG. 16B. In this embodiment the continuous winding fibres 30, i.e. electrical conductor fibre wefts 30, are arranged on the grid formed by the structural fibres 20, i.e. fibre warps 20 with non-conductive surface (and possibly fibre warps with mechanical, electromagnetic and/or thermal properties), at the same time as the electromagnetic mat 10 is rolled-up on the cylindrical object 50, e.g. base 50. Alternatively the resulting electromagnetic mat 10 may be folded. This production method results in a zig-zag, skewed, or tilted, winding pattern, as shown in FIG. 16C. Benefits of this design are that end-windings and harmonics may be reduced, which may result in lower weight and higher efficiency.

Also this embodiment can make use of the intermediate step of impregnation and final step of molding. This embodiment may also be adapted for the use of discrete winding fibre lengths 30, e.g. cut electrical conductor fibre wefts 30, but this will require attachment of the discrete winding fibre lengths 30 to the grid of structural fibres 20 e.g. fibre warps 20 with non-conductive surface (and possibly fibre warps with mechanical, electromagnetic and/or thermal properties) e.g. by the tape, by impregnation or some other suitable means.

This embodiment may benefit from the advantages of the prior described embodiments, including the design of the pattern of the winding fibres, e.g. electrical conductor fibre wefts, geometry, connection of the winding fibres, and the use of discrete or continuous winding fibres, e.g. cut or continuous electrical conductor fibre wefts.

As for the other embodiments property modifying fibres can be incorporated, e.g. fibre warps and/or fibre wefts with mechanical, electromagnetic and/or thermal properties can be utilized. For example iron fibre wefts 70 may be used to create tilted or skewed iron teeth. Iron fibre warps or wefts 70 may also be used to create back iron (e.g. in the case where the first, or last, part of the electromagnetic mat 10 is pure or mainly iron).

The electromagnetic mat 10 may further be provided with other objects, such as magnets or pipes. For example the electromagnetic mat 10 may be provided with water pipes for improved cooling properties.

In a further modification, the method may further comprise forming, e.g. weaving, twining or winding, a mat without winding fibres, e.g. a mat with non-conductive wefts and/or wefts with other mechanical, electromagnetic and/or thermal properties and warps with electromagnetic, mechanical and/or thermal properties and/or warps with conductive properties. For instance, a mat without conductive fibres but with electromagnetic, mechanical and/or thermal properties could be created and used as part of a rotor or stator component to enhance properties. For instance, mats of mentioned properties could be plied or formed by rolling or folding on rotor or stator components, either on top, under, or between layers with conductive properties, i.e. layers with the winding fibres. For instance, these mats may have flux carrying or thermally conductive properties and be applied to the outer or inner surface of a rotor or stator component. This may be as part of the production process of the electromagnetic mat with winding fibres or in a separate step before or after the production of the electromagnetic mat with winding fibres.

The following section sets out an exemplary slotless electric motor that was designed and manufactured using an electromagnetic mat to form the windings. Whilst it should be appreciated that the stator and rotor can be constructed in a variety of ways, one exemplary stator was formed in the following way.

A plurality of structural fibres 20 were threaded in a customized loom. A tension was applied per structural fibre 20, with the tension varying between the structural fibres 20. The outermost structural fibres 20 (the distance between which is the active area) were placed parallel with a number of structural fibres in parallel in the active area between the two outermost structural fibres. One end of each structural fibre was connected to a cylindrical base. The width of the base was equal to the active width of the electromagnetic mat 10. The outer diameter of the base was equal to the desired inner diameter of the stator.

The base was attached to a rotor by which it could be turned, so as to roll up the connected structural fibres 20 (and hence electromagnetic mat 10) onto the base.

The base had in this example two main purposes, 1) to act as a mold for the electromagnetic mat 10 so it can be shaped into a radial flux stator component, and 2) function as a flux leader (i.e. back-iron) in the stator.

Winding fibres 30 were inserted in the structural fibre lengths to form the electromagnetic mat. The winding fibres 30 were inserted at the wire insertion region of the loom in a three phase winding pattern. The winding fibres 30 were locked in place in a plain-weave pattern by the structural fibres 20, so to create a three phase distributed winding pattern, with one winding fibre 30 per shed. Continuous winding fibres 30 were used and which were woven into the structural fibres using shuttles.

The electromagnetic mat 10 was formed by rolling up the woven electromagnetic mat onto the base to form a plurality of layers. Each layer had a plurality of poles and the poles had an angular width of 360/(the number of poles) degrees. Each layer where thus of different/increasing lengths with an increased distance between the winding fibre lengths so that each pole was placed exactly in its respective slot, i.e. aligned with the other winding fibre lengths. The structural fibres extending out of the electromagnetic mat 10 were cut. The free ends of the structural fibers 20 were stitched to the rolled up electromagnetic mat to prevent it from unraveling. The rolled up electromagnetic mat was then molded with a resin and hardener, and cured. The end of the winding fibres extending out from the molded stator, were then connected to a circuit board in the desired parallel/series combinations.

The above described embodiments and examples can be combined and modified to form other embodiments and examples which are within the scope of the invention as defined by the claims.

The invention claimed is:

1. A method of producing an electromagnetic mat for forming a stator or rotor component of a multiphase ironless or slotless electric machine, wherein the electromagnetic mat comprises:
  non-conductive structural fibre lengths; and
  a plurality of continuous winding fibre lengths for forming winding fibres that are in a winding pattern for forming multiple windings of the multiphase ironless or slotless electric machine, the method comprising:
(a) forming a support structure with the non-conductive structural fibre lengths, and
(b) inserting the continuous winding fibre lengths into the support structure so that the continuous winding fibre lengths extend across the structural fibre lengths and the structural fibre lengths lock the continuous winding fibre lengths in position to form the electromagnetic mat,
wherein the inserting the continuous winding fibre lengths into the support structure comprises weaving the continuous winding fibre lengths back and forth across the structural fibre lengths and aligning the continuous winding fibre lengths in a winding pattern so as to create a moving electromagnetic field when induced with an alternating current or a constant electromagnetic field when induced with direct current.

2. The method according to claim 1, wherein the electromagnetic mat is formed with additional fibre lengths having predetermined electromagnetic, thermal, mechanical and/or electrical properties.

3. The method according to claim 1, comprising a step of shaping the electromagnetic mat into a shape for forming at least a part of the stator or rotor component of the electric machine.

4. The method according to claim 3, wherein the step of shaping the electromagnetic mat is performed on a base or by layering the electromagnetic mat onto itself to form the stator or rotor component.

5. The method according to claim 4, comprising shaping the electromagnetic mat by arranging or rolling the electromagnetic mat onto the base.

6. The method according to claim 5, comprising a step of connecting at least one of the structural fibre lengths to the base before the electromagnetic mat is rolled onto the base.

7. The method according to claim 4, comprising a step of forming the stator or rotor component with the base as a part of the stator or rotor component.

8. The method according to claim 1, comprising a step of incorporating an object within the rotor or stator component by providing the object between layers of the electromagnetic mat.

9. The method according to claim 1, comprising a step of impregnating the electromagnetic mat with a solidifiable material, and solidifying the solidifiable material to set the electromagnetic mat in the shape for forming the stator or rotor component.

10. The method according to claim 1, wherein the electromagnetic mat is formed as part of a continuous forming process that is for forming a plurality of electromagnetic mats, and wherein the method comprises cutting the structural fibre lengths to form the electromagnetic mat for forming the stator or rotor component of an electric machine.

11. The method according to claim 10, comprising a step of shaping the electromagnetic mat into a shape for forming at least a part of the stator or rotor component of the electric machine, wherein the step of shaping the electromagnetic mat is performed before the step of cutting the structural fibre lengths.

12. The method according to claim 1, wherein the electromagnetic mat is performed using a machine that is controllable to allow adjustment of one or more of a winding pattern and dimensions of the electromagnetic mat.

13. An electromagnetic mat for forming a stator or rotor component of a multiphase ironless or slotless electric machine, comprising:
non-conductive structural fibre lengths that form a support structure; and
a plurality of continuous winding fibre lengths forming winding fibres that is in a winding pattern for forming multiple windings of the multiphase ironless or slotless electric machine,
wherein the continuous winding fibre lengths have been woven into the support structure so that the continuous winding fibre lengths extend back and forth across the structural fibre lengths and the structural fibre lengths lock the continuous winding fibre lengths in position, and wherein the continuous winding fibre lengths are aligned in a winding pattern configured to create a moving electromagnetic field when induced with an alternating current or a constant electromagnetic field when induced with direct current.

14. The electromagnetic mat according to claim 13, further comprising utilizing property modifying fibre lengths in the electromagnetic mat, said property modifying fibre lengths having predetermined electromagnetic, thermal, mechanical and/or electrical properties.

15. The electromagnetic mat according to claim 13, wherein the structural fibre lengths extend in a longitudinal direction of the electromagnetic mat and the winding fibre lengths extend in mainly transversal direction of the electromagnetic mat.

16. The electromagnetic mat according to claim 13, wherein the electromagnetic mat is shaped to form a stator or rotor component of an electric machine.

17. The electromagnetic mat according to claim 16, wherein the electromagnetic mat is shaped by being arranged or rolled onto a base or layered onto itself.

18. The electromagnetic mat according to claim 17, wherein the base is a part of the stator or rotor component.

19. The electromagnetic mat according to claim 13, comprising an object incorporated within the rotor or stator component, wherein the object is between layers of the electromagnetic mat.

20. The electromagnetic mat according to claim 13, comprising a solidifiable material impregnated into the electromagnetic mat, wherein the solidifiable material is solidified to set the electromagnetic mat in the shape for forming the stator or rotor component.

* * * * *